United States Patent
Ohya et al.

(10) Patent No.: US 7,382,986 B2
(45) Date of Patent: Jun. 3, 2008

(54) SIGNAL CONVERTER, OPTICAL TRANSMITTER AND OPTICAL FIBER TRANSMISSION SYSTEM

(75) Inventors: Jun Ohya, Osaka (JP); Masaru Fuse, Osaka (JP); Seiichiro Kawashima, Kanagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 828 days.

(21) Appl. No.: 10/423,950

(22) Filed: Apr. 28, 2003

(65) Prior Publication Data

US 2003/0198476 A1  Oct. 23, 2003

Related U.S. Application Data

(62) Division of application No. 09/186,142, filed on Nov. 5, 1998, now Pat. No. 6,556,327.

(30) Foreign Application Priority Data

Nov. 6, 1997 (JP) .................................. 9-303985
Nov. 6, 1997 (JP) .................................. 9-303986

(51) Int. Cl.
*H04B 10/04* (2006.01)
*H04B 10/12* (2006.01)

(52) U.S. Cl. ....................... 398/186; 398/183; 398/187

(58) Field of Classification Search ................ 398/186, 398/185, 183, 187, 198, 182
See application file for complete search history.

(56) References Cited

U.S. PATENT DOCUMENTS

| 4,236,243 A | 11/1980 | Davies et al. | |
| 4,989,200 A * | 1/1991 | Olshansky et al. | ........... 398/76 |
| 5,420,868 A | 5/1995 | Chraplyvy et al. | |
| 5,515,196 A | 5/1996 | Kitajima et al. | |
| 5,541,757 A | 7/1996 | Fuse et al. | |
| 5,566,381 A | 10/1996 | Korotky | |
| 5,699,179 A | 12/1997 | Gopalakrishnan | |
| 5,751,455 A * | 5/1998 | Shibutani et al. | ............. 398/76 |
| 5,777,771 A * | 7/1998 | Smith | .......................... 398/182 |
| 5,907,421 A | 5/1999 | Warren et al. | |
| 5,917,628 A | 6/1999 | Ooi et al. | |

OTHER PUBLICATIONS

K. Kikushima et al., "Nonrepeated Long-Haul Multichannel AM-Video Transmission Employing Optical Heterodyne AM/FM Convertor", IEEE Photonics Technology Letters, vol. 8, No. 5, pp. 709-711, May 1996.

* cited by examiner

*Primary Examiner*—M. R. Sedighian
(74) *Attorney, Agent, or Firm*—Nixon Peabody LLP; Jeffrey L. Costellia

(57) ABSTRACT

The signal converter of the present invention receives a multichannel video signal and converts the video signal into a microwave signal, the phase of which has been modulated with the video signal. The signal converter includes: a laser light source; a modulating section for modulating the phase of output light of the laser light source with the multichannel video signal and modulating the intensity of the output light with the microwave signal; and a light receiver for receiving the output light modulated by the modulating section and for outputting the microwave signal, the phase of which has been modulated with the multichannel video signal.

3 Claims, 21 Drawing Sheets

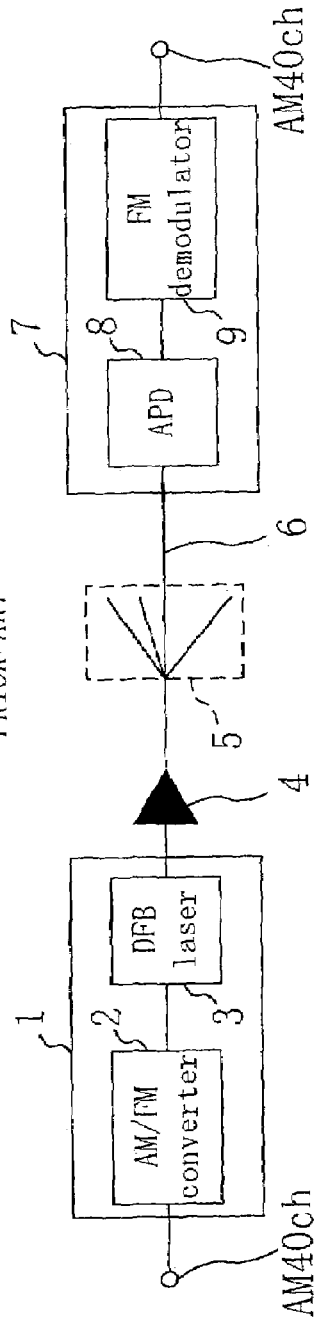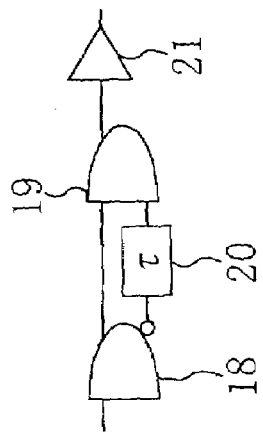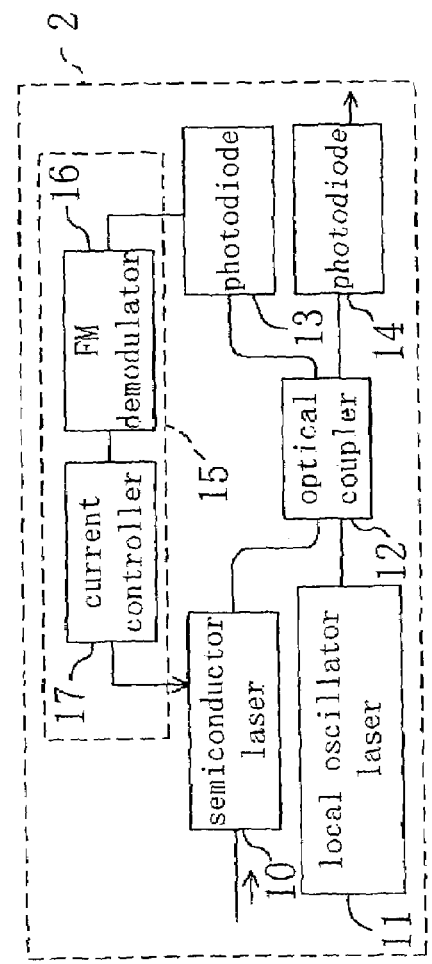

Spectrum of output light

Spectrum of output light

Spectrum of output light

SIGNAL CONVERTER, OPTICAL TRANSMITTER AND OPTICAL FIBER TRANSMISSION SYSTEM

BACKGROUND OF THE INVENTION

The present invention relates to signal converter, optical transmitter and optical fiber transmission system for transmitting a multichannel analog signal, a digital video signal or the like through an optical fiber.

In a suggested method for transmitting and distributing a multichannel video signal to users' homes, the output light of a semiconductor laser is directly modulated with the multichannel video signal, and an optical signal resulting therefrom is transmitted through an optical fiber and directly detected by an optical receiver. An amplitude-modulated (AM) video signal transmission technique is currently in high demand, because this technique has excellent compatibility with existing CATV's. However, in accordance with this technique, excellent carrier-to-noise ratio (CNR) and distortion characteristics are required. Accordingly, in employing this technique, the transmission distance and the number of branches of an optical fiber are adversely limited and the resistance of an optical fiber connector to reflection is disadvantageously low.

In order to solve these problems, a method for distributing a multichannel video signal using an AM/FM simultaneous converter of an optical heterodyne detection type is proposed. Such a method is described by K. Kikushima et al., "Super-wide-band Optical FM Modulation Scheme and its Application to Multichannel AM Video Transmission Systems, IEEE Photonics Technology Letters, pp. 839-841, 1996, for example.

Hereinafter, a conventional optical fiber transmission system of an AM/FM simultaneous conversion type will be described with reference to FIGS. 1A through 1C.

As shown in FIG. 1A, an optical transmitter 1 of this optical fiber transmission system includes an AM/FM converter 2 and a semiconductor laser 3 for transmission. The optical transmitter 1 generates an optical signal. The intensity of the optical signal has been modulated with a microwave signal, the frequency of which has been modulated with an AM multichannel video signal. The optical signal output from the optical transmitter 1 is amplified by an optical fiber amplifier 4. The amplified signal is branched by an optical fiber coupler 5 into respective paths of an optical fiber 6, through which the optical signal is transmitted. The optical signal, which has been transmitted through the optical fiber 6, is received by an optical receiver 7. Specifically, an avalanche photodiode (APD) 8 of the optical receiver 7 receives the optical signal. The APD 8 converts the optical signal into a microwave signal, the frequency of which has been modulated with the AM multichannel video signal. And the microwave signal is demodulated by an FM demodulator 9 into the AM multichannel video signal.

FIG. 1B illustrates the internal configuration of the AM/FM converter 2. In the AM/FM converter 2, first, a semiconductor laser 10 is subjected to frequency modulation. Next, the output light of a local oscillator laser 11 is coupled with the output light of the semiconductor laser 10 at an optical coupler 12. Part of the coupled light is irradiated to a photodiode 14, which performs a heterodyne detection on the light so as to output a microwave signal having had the frequency modulated with the AM multichannel video signal. The carrier frequency of the microwave signal is equal to a beat frequency ($\upsilon 2-\upsilon 1$), which is the difference between the frequency $\upsilon 1$ of the semiconductor laser 10 and the frequency $\upsilon 2$ of the local oscillator laser 11.

The other part of the coupled light is irradiated to the other photodiode 13, which also performs a heterodyne detection on the light so as to output a microwave signal. The microwave signal is fed back to the semiconductor laser 10 through an auto frequency control (AFC) loop 15. This feedback loop can control the driving current of the semiconductor laser 10 and stabilize the carrier frequency. The AFC loop 15 includes an FM modulator 16 and an FM laser current controller 17.

Next, the semiconductor laser 3 for transmission (i.e., a distributed feedback (DFB) laser) is subjected to intensity modulation with the output signal of the AM/FM converter 2. As a result, the optical signal is output from the optical transmitter 1.

FIG. 1C illustrates the configuration of the FM demodulator 9 in the optical receiver 7. The FM demodulator 9 includes AND gates 18, 19, a delay line 20 and an amplifier 21 and demodulates the microwave signal output by the APD 8 into a multichannel video signal.

In accordance with such a transmission system, the minimum light-receiving level can be increased by about 10 dB and the reflective resistance of the optical fiber connector can be considerably improved as compared with a conventional AM transmission technique.

This conventional converter uses the AFC loop 15. However, if the temperature of the environment surrounding the semiconductor laser 10 changes, then the respective frequencies $\upsilon 1$ and $\upsilon 2$ of the semiconductor laser 10 and the local oscillator laser 11 also change. Accordingly, the intermediate frequency fIF ($=\upsilon 2-\upsilon 1$) is greatly variable with the changing environmental temperature. FIG. 2A illustrates the spectra of the laser light emitted from the semiconductor laser 10 and the laser light emitted from the local oscillator laser 11. As for the laser light emitted from the semiconductor laser 10, both the spectrum of the laser light at the frequency $\upsilon 1$ (having a relatively narrow distribution) and the spectrum of the AM multichannel video signal carried by the laser light (having a relatively broad distribution) are illustrated. FIG. 2B illustrates the spectrum of the carrier of the microwave signal at the intermediate frequency fIF ($=\upsilon 2-\upsilon 1$) and the spectrum of the AM multichannel video signal carried by the carrier. As described above, as the intermediate frequency fIF ($=\upsilon 2-\upsilon 1$) greatly changes with the changing environmental temperature, the spectrum of the intermediate frequency fIF shown in FIG. 2B has a broader width. FIG. 2C illustrates the intensity ratio of carrier to noise. As the width of the spectrum of the intermediate frequency fIF becomes broader, the intensity of the noise component increases relative to the intensity of the carrier. As a result, the CNR (carrier-to-noise ratio) decreases and the signal quality deteriorates.

In addition, in the conventional optical receiver 7, the optical signal needs to be received by the APD 8 operating in a broad band (e.g., 6 GHz) and the FM demodulator 9 needs to convert the optical signal into an electrical signal by using high-speed AND gates 18 and 19 that can operate at 6 GHz. In connecting high-speed devices such as these on multiple stages, since the frequency characteristics of the respective devices deviate from each other in terms of amplitude and group delay, such deviations are added to each other, thereby deteriorating noise and distortion characteristics. The broader band operation is advantageous in improving the noise characteristics. However, so long as electric devices such as AND gates are used, there is a limit on the high-speed operation. Since a band limitation is imposed, the deterioration of noise and distortion characteristics is inevitable.

SUMMARY OF THE INVENTION

In view of the above-described problems, the present invention was made to provide a signal converter exhibiting excellent CNR characteristics without using an AFC circuit, and provide an optical transmitter and an optical fiber transmission system showing high resistance to wavelength dispersion by using the same. Another object of the present invention is to provide a signal converter exhibiting excellent CNR characteristics and an optical transmitter and an optical fiber transmission system using the same.

A signal converter according to one aspect of the present invention receives a multichannel video signal and converts the video signal into a microwave signal, the phase of which has been modulated with the video signal. The signal converter includes: a laser light source; modulation means for modulating the phase of output light of the laser light source with the multichannel video signal and modulating the intensity of the output light with the microwave signal; and a light receiver for receiving the output light modulated by the modulation means and for outputting the microwave signal, the phase of which has been modulated with the multichannel video signal.

A signal converter according to another aspect of the present invention receives a multichannel video signal and converts the video signal into a microwave signal, the frequency of which has been modulated with the video signal. The signal converter includes: a laser light source; modulation means for modulating the frequency of output light of the laser light source with the multichannel video signal and modulating the intensity of the output light with the microwave signal; and a light receiver for receiving the output light modulated by the modulation means and for outputting the microwave signal, the frequency of which has been modulated with the multichannel video signal.

An optical transmitter according to one aspect of the present invention includes: the signal converter according to either aspect of the present invention; and a semiconductor laser for transmission. An output signal of the signal converter is superimposed with driving current of the semiconductor laser for transmission, thereby modulating the intensity of output light of the semiconductor laser with the output signal of the signal converter.

An optical transmitter according to another aspect of the present invention includes: the signal converter according to either aspect of the present invention; a semiconductor laser for transmission; and a light intensity modulator for transmission. The light intensity modulator for transmission modulates the intensity of output light of the semiconductor laser by using an output signal of the signal converter.

An optical fiber transmission system according to the present invention includes: the optical transmitter according to either aspect of the present invention; an optical fiber for transmitting an optical signal output from the optical transmitter; and a light receiver for converting the optical signal, transmitted through the optical fiber, into a multichannel video signal.

A multichanneled optical fiber transmission system according to the present invention includes: the optical transmitter according to either aspect of the present invention; an optical fiber amplifier for amplifying an optical signal output from the optical transmitter; an optical coupler for branching the amplified optical signal; an optical fiber for transmitting the branched optical signal; and a light receiver for converting the optical signal, transmitted through the optical fiber, into a multichannel video signal.

An optical signal converter according to the present invention includes: an optical output limiter for receiving an optical signal having had the intensity thereof modulated with a sub-carrier having had the frequency thereof modulated with a multichannel signal and for outputting light while the level of the waveform of the optical signal is at a predetermined level or higher, thereby generating a first optical pulse train; an optical delay circuit for delaying the first optical pulse train to generate a second optical pulse train; and an optical logic element for outputting a third optical to pulse train having an optical pulse interval proportional to the multichannel signal based on the first and the second optical pulse trains.

An optical receiver according to the present invention includes: the optical signal converter of the present invention; and a light receiver for receiving the third optical pulse train, output from the optical signal converter, and converting the third optical pulse train into an electrical signal.

Another optical fiber transmission system according to the present invention includes: an optical transmitter for generating an optical signal, the intensity of which has been modulated with a sub-carrier having had the frequency thereof modulated with a multichannel signal; an optical fiber for transmission for transmitting the optical signal; and an optical receiver for receiving the optical signal through the optical fiber for transmission, and demodulating the multichannel signal from the optical signal. The optical receiver includes: an optical signal converter for outputting an optical pulse train based on the optical signal, the optical pulse interval of the train being proportional to the multichannel signal; and a photoelectric transducing section for receiving the optical pulse train and converting the train into an electrical signal.

Another multichanneled optical fiber transmission system according to the present invention includes: an optical transmitter for generating an optical signal, the intensity of which has been modulated with a sub-carrier having had the frequency thereof modulated with a multichannel signal; an optical fiber amplifier for amplifying the optical signal; an optical coupler for branching the optical signal into a plurality of luminous fluxes; an optical fiber for transmission for transmitting the branched optical signal; and an optical receiver for receiving the optical signal through the optical fiber for transmission, and demodulating the multichannel signal from the optical signal. The optical receiver includes: an optical signal converter for outputting an optical pulse train based on the optical signal, the optical pulse interval of the optical pulse train being proportional to the multichannel signal; and a photoelectric transducing section for receiving the optical pulse train and converting the train into an electrical signal.

BRIEF DESCRIPTION OF THE DRAWINGS

FIG. 1A is a block diagram illustrating an arrangement for a conventional optical fiber transmission system;

FIG. 1B is a block diagram illustrating the internal configuration of an AM/FM converter included in the optical fiber transmission system; and FIG. 1C is a diagram illustrating the internal configuration of an FM demodulator.

DESCRIPTION OF THE PREFERRED EMBODIMENTS

First, the principle of the present invention will be described. In accordance with prior art, two semiconductor lasers used for signal conversion and local oscillation, respectively, are provided in an AM/FM signal converter, and an intermediate frequency obtained based on the beat signals of these lasers is used as a carrier frequency. By contrast, according to the present invention, a single semiconductor laser is provided in a signal converter and a signal generated by the semiconductor laser is branched and used.

Hereinafter, the problems involved with the use of two semiconductor lasers will be clarified.

Assume the electric field of laser light for signal conversion is denoted by $E_1$ and the electric field of laser light for local oscillation is denoted by $E_2$. Then, these electric fields are given by the following equations:

$$E_1 = E_{10} \cos\{\omega_1 t + \beta \cos \omega_m t + \Delta\Phi_1(t)\}$$

$$E_2 = E_{20} \cos\{\omega_2 t + \Delta\Phi_2(t)\}$$

where $E_{10}$ is a constant; $\omega_1$ is the frequency of the laser for signal conversion; t is a time; $\beta$ is a constant; $\omega_m$ is a modulation frequency; $\Delta\Phi_1(t)$ is a parameter specific to the laser for signal conversion (which is variable randomly with the time); $E_{20}$ is a constant; $\omega_2$ is the frequency of the laser for local oscillation; and $\Delta\Phi_2(t)$ is a parameter specific to the laser for local oscillation.

The intensity obtained by superimposing the two laser light with each other is given by the following equation:

$$(E_1+E_2)^2 = (E_{10})^2 + (E_{20})^2 + E_{10}E_{20}\cos\{(\omega_1-\omega_2)t + \beta\cos\omega_m t + \Delta\Phi_1(t) - \Delta\Phi_2(t)\}$$

In using two semiconductor lasers, $\Delta\Phi_1(t)-\Delta\Phi_2(t)$ is not equal to zero. The line width of a carrier signal (having a frequency of $(\omega_1-\omega_2)$) increases presumably because of this difference. In accordance with the present invention, only one semiconductor laser is used for signal conversion, thereby realizing the relationship $\Delta\Phi_1(t)=\Delta\Phi_2(t)$. As a result, the line width of the carrier signal can be reduced and a satisfactory CNR can be maintained. Also, according to the present invention, the frequency of the carrier signal (i.e., the intermediate frequency) is electrically generated by a signal generator such as a radio-frequency oscillator, not based on the beat frequency. Accordingly, compared with using the beat frequency of laser light, the carrier frequency can be much more stabilized.

Embodiment 1 of Signal Converter

Figure 2A:
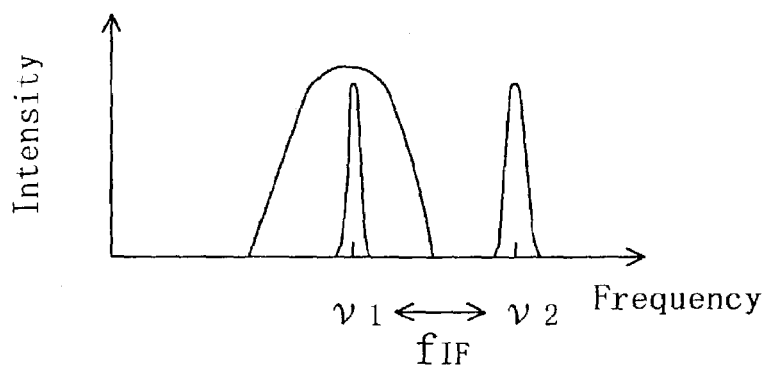
FIGS. 2A through 2C are graphs illustrating the relationships between the frequency of a semiconductor laser for signal conversion and the frequency of a local oscillator laser.
Figure 2B:
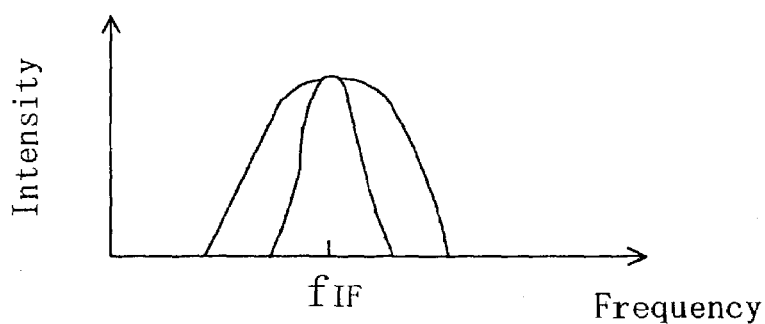
Figure 2C:
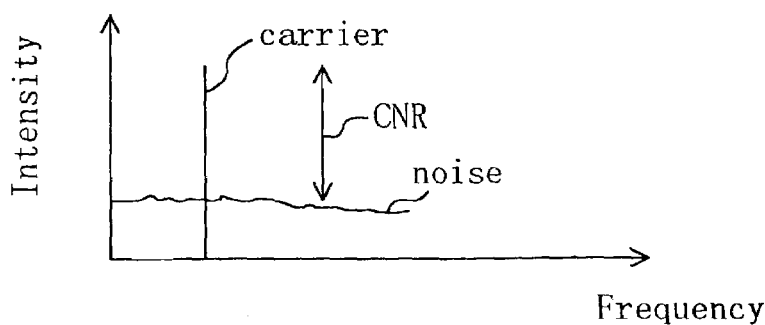
Figure 3:
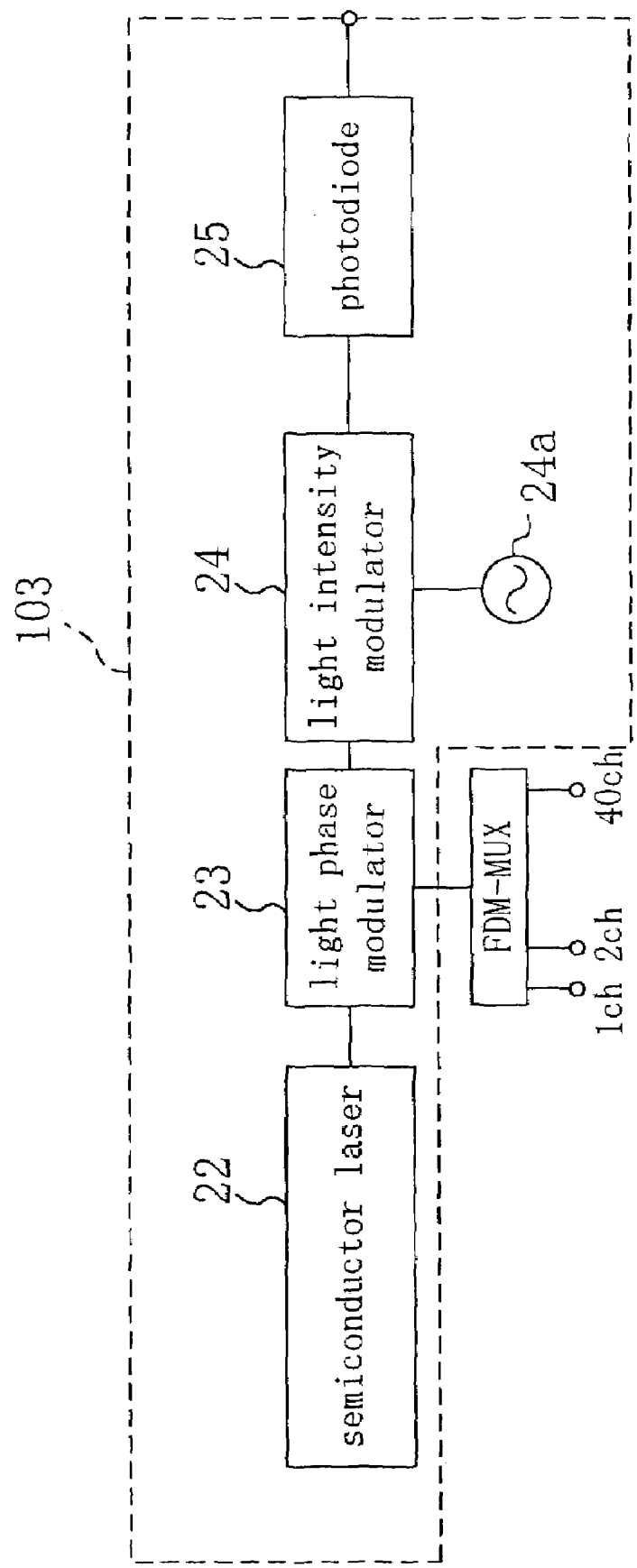
FIG. 3 is a block diagram illustrating an arrangement in the first embodiment of the signal converter according to the present invention.

First, FIG. 3 will be referred to. In a signal converter 103 in the first embodiment, a semiconductor laser (laser light source) 22; a light phase modulator 23 for modulating the phase of laser light; a light intensity modulator 24 for modulating the intensity of the laser light; and a photodiode 25 (light receiver) for converting an optical signal into an electrical signal are serially connected to each other in this order. As shown in FIG. 3, the number of the semiconductor laser 22 provided in the signal converter 103 is one and the signal conversion is performed by using only the laser light emitted from the semiconductor laser 22. The semiconductor laser 22 is a DFB laser emitting light on the wavelength band of 1.55 μm and having an oscillation frequency $\omega_1$ of $1.94 \times 10^{14}$ Hz and a spectral line width of 100 kHz.

The phase of the output light from the semiconductor laser 22 (at the frequency $\omega_1$) is modulated by the light phase modulator 23 with a 40-channel AM video signal. The 40-channel AM video signal is an analog signal generated by a multichannel signal generator for performing frequency division multiplexing on video information on 40 channels (hereinafter, such a generator will be called an "FDM-MUX"). The carrier for the 40 channels is located in the range from 90 MHz to 330 MHz on the axis of frequencies at an interval of 6 MHz, for example.

Figure 4A:
FIGS. 4A through 4E are diagrams illustrating the signal waveforms at respective principal sections of the signal converter shown in FIG. 3.
Figure 4B:
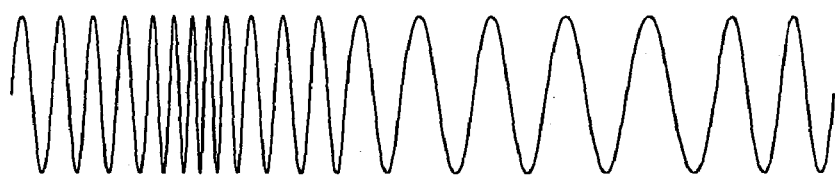
Figure 4C:
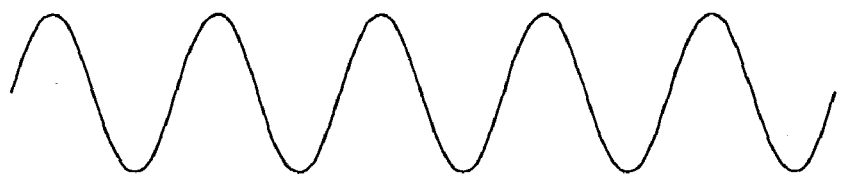
Figure 4D:
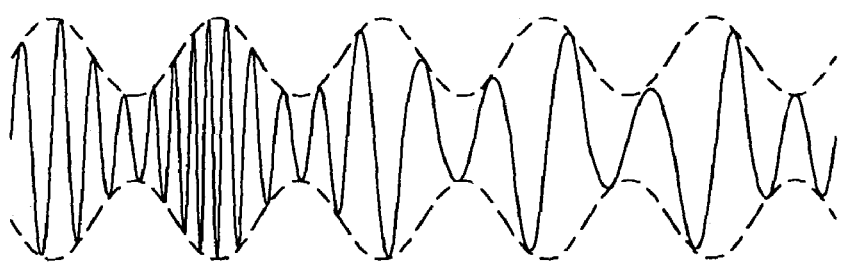

In this manner, the information of the 40-channel AM video signal is carried first on the laser light at the frequency of $\omega_1$ in this embodiment. Thereafter, the intensity of the phase-modulated laser light is modulated by using a sine wave signal having a frequency $\omega_{IF}$=3 GHz. The intensity modulation is performed by the light intensity modulator 24. FIG. 4A illustrates the waveform of the 40-channel AM video signal. FIG. 4B illustrates the waveform of the laser light having had the phase thereof modulated with the signal shown in FIG. 4A. FIG. 4C illustrates the waveform of the sine wave signal having a frequency $\omega_{IF}$=3 GHz. By modulating the intensity of the phase-modulated laser light with the sine wave signal having a frequency $\omega_{IF}$=3 GHz, a signal waveform shown in FIG. 4D is obtained. The signal shown in FIG. 4D includes an optical signal having a component, the frequency of which is $\omega_1 - \omega_{IF}$. The optical signal having the frequency of $\omega_1 - \omega_{IF}$ includes the information of the 40-channel AM video signal as phase-modulated quantity. It is noted that the components having a frequency of $\omega_1 + \omega_{IF}$ resulting from the intensity modulation and the components having a frequency of $\omega_1$ are filtered naturally or intentionally so as not to affect the signal detection to be performed later.

Figure 4E:
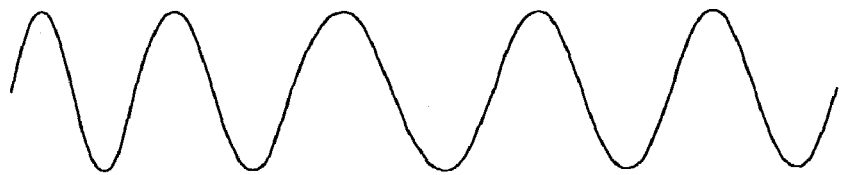

The optical signal (having the frequency of $\omega_1 - \omega_{IF}$) output from the light intensity modulator 24 is supplied to the photodiode 25. When the optical signal (having the frequency of $\omega_1 - \omega_{IF}$) is received by the photodiode 25, a beating phenomenon generates. As a result, the output of the photodiode 25 is an electrical signal having an intermediate frequency $\omega_{IF}$ (=3 GHz) shown in FIG. 4E. The photodiode 25 functions as a low pass filter. The electrical signal obtained in this manner uses a microwave signal having a frequency of 3 GHz as a carrier and includes the information of the 40-channel AM video signal as phase-modulated quantity.

Figure 5:
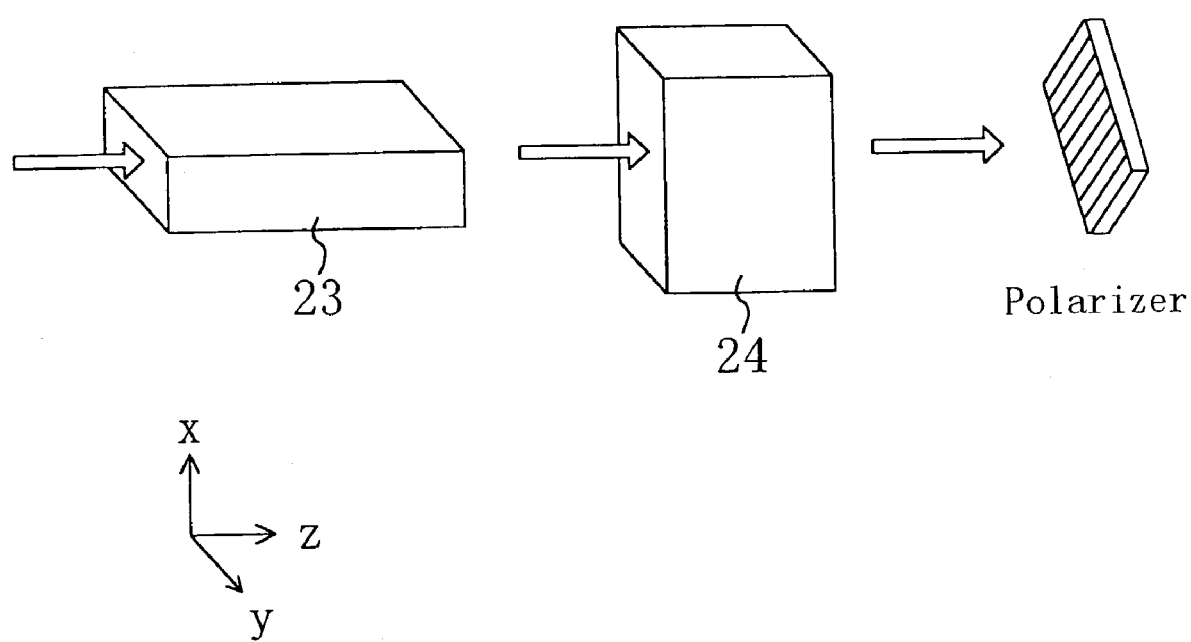
FIG. 5 is a perspective view illustrating an exemplary arrangement of a light phase modulator and a light intensity modulator.

FIG. 5 is a perspective view schematically illustrating the arrangement of the light phase modulator 23 and the light intensity modulator 24. Each of the light phase modulator 23 and the light intensity modulator 24 includes an $LiNbO_3$ substrate and an electrode applying a driving voltage to the substrate. In the exemplary arrangement illustrated in FIG. 5, a pair of modulators, having substantially the same structure, are arranged in such a relationship that one of the modulators can be positioned by rotating the other by 90 degrees about the optical axis of an optical signal. In such an arrangement, the phase of light polarized in a direction parallel to the y-axis is modulated by the light phase modulator 23 but is not modulated by the light intensity modulator 24. On the other hand, the phase of light polarized in a direction parallel to the x-axis is not modulated by the light phase modulator 23 but is modulated by the light intensity modulator 24. Accordingly, if light, which is polarized in parallel to an axis defined by rotating the x-axis toward the y-axis by 45 degrees, is incident to the light phase modulator 23 and the light intensity modulator 24, then light in which a phase-modulated component and an intensity-modulated component are coupled with each other, can be obtained. Furthermore, if the coupled light, transmitted through a polarizer having a polarization axis arranged to transmit the component parallel to the axis defined by rotating the x-axis toward the y-axis by 45 degrees, is irradiated to a photodiode, then a beat phenomenon generates between the phase-modulated component and the intensity-modulated component. As a result, a microwave signal, the phase of which has been modulated with the video signal, can be obtained.

The electrical signal (i.e., the microwave signal) output from the photodiode 25 in the signal converter 103 is used as a signal for modulating a semiconductor laser for transmission such as a DFB laser (not shown). The output of the semiconductor laser for transmission is transmitted to an optical fiber as an optical signal, the intensity of which has been modulated with the electrical signal. The optical signal transmitted through the optical fiber is a phase-modulated signal. Thus, compared with transmitting an amplitude-modulated signal (AM signal) as it is, multichannel video information can be distributed with a lower minimum light receiving level and higher resistance to reflection and wavelength dispersion.

In this embodiment, the AM 40-channel video signal and the sine wave signal having a frequency of 3 GHz are mixed by the photodiode 25 in this manner. As a result, a microwave signal, obtained by modulating the phase of the carrier signal having a frequency of 3 GHz with the 40-channel AM video signal, is output from the photodiode 25. Since the number of the semiconductor laser used is one, an electrical signal to be transmitted can be produced with smaller noise generated in the carrier signal having a frequency of 3 GHz and with a higher CNR.

In this embodiment, the carrier frequency of the signal output from the signal converter 103 is determined by a signal generator 24a for modulating the intensity of light. Accordingly, a microwave signal with a stabilized frequency can be obtained without an AFC loop. This is because, although the carrier frequency is obtained based on a beat frequency of the laser light output from two semiconductor lasers in accordance with prior art, the carrier frequency (intermediate frequency $\omega_{IF}$=3 GHZ) is generated by an electric circuit and supplied stably in this embodiment. Accordingly, in this embodiment, even if an environmental temperature has changed, the carrier frequency is invariable and a microwave signal can be obtained stably.

In this embodiment, a DFB laser emitting light on the wavelength band of 1.55 μm is used as the semiconductor laser 22. Alternatively, a semiconductor laser emitting light on any other wavelength band may be used. Furthermore, a semiconductor laser including an external resonant cavity and having a smaller spectral line width than that of a DFB laser or a YAG semiconductor laser including a ring-shaped resonant cavity, which is a solid-state laser optically pumped by a semiconductor laser, may also be used as the laser light source.

The positional relationship between the light phase modulator 23 and the light intensity modulator 24 is not limited to the illustrated one. Alternatively, these modulators may be disposed in the inverse order.

Embodiment 2 of Signal Converter

Figure 6:
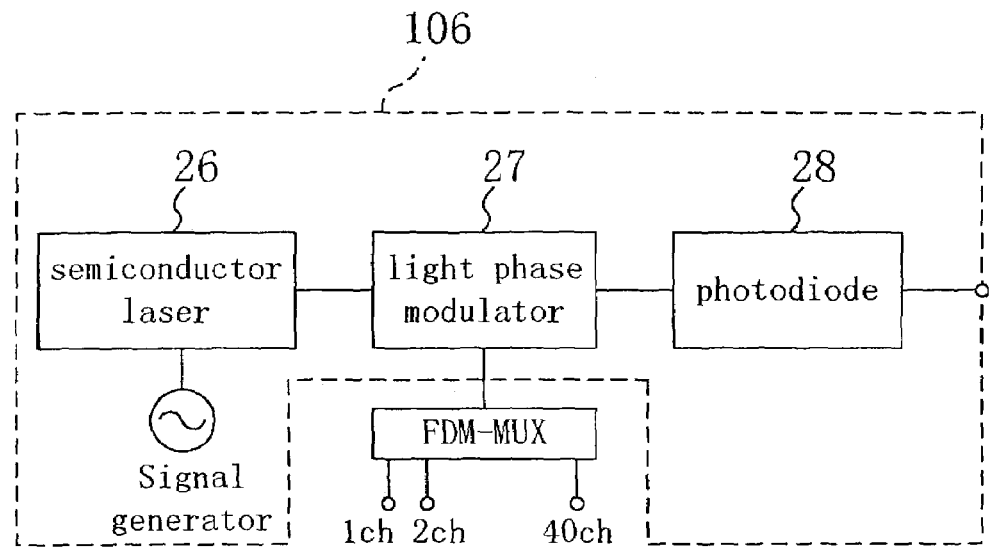
FIG. 6 is a block diagram illustrating an arrangement in the second embodiment of the signal converter according to the present invention.

Hereinafter, the second embodiment of the signal converter according to the present invention will be described with reference to FIG. 6.

In the signal converter 106 in the second embodiment, a semiconductor laser (laser light source) 26; a light phase modulator 27 for modulating the phase of laser light; and a photodiode (light receiver) 28 for converting an optical signal into an electrical signal are serially connected to each other in this order. As shown in FIG. 6, the number of the semiconductor laser 26 provided in the signal converter 106 is one and the signal conversion is performed by using only the laser light emitted from the semiconductor laser 26. The semiconductor laser 26 is a DFB laser emitting light on the wavelength band of 1.55 μm and having an oscillation frequency $\omega_1$ of $1.94 \times 10^{14}$ Hz and a spectral line width of 100 kHz.

The intensity of the output light of the semiconductor laser 26 is modulated with a sine wave signal having a frequency $\omega_F$=3 GHz, which is generated by a signal generator and superimposed with the driving current of the semiconductor laser 26. As a result, output light having a component with a frequency $\omega_1 - \omega_F$ is generated. The phase of the output light (having a frequency of $\omega_1 - \omega_F$) is modulated by the light phase modulator 27 with the 40-channel AM video signal. The 40-channel AM video signal is an analog signal generated by an FDM-MUX for performing frequency division multiplexing on the 40-channel video information.

The output light of the light phase modulator 27 is received by the photodiode 28. A microwave signal, obtained by modulating the phase of a carrier signal having a frequency $\omega$=3 GHz with the 40-channel AM video signal, is output from the photodiode 28.

In this embodiment, the semiconductor laser is directly subjected to intensity modulation in this manner. Accordingly, the signal converter in this embodiment does not require the light intensity modulator shown in FIG. 3 and has a simpler configuration.

Embodiment 3 of Signal Converter

Figure 7:
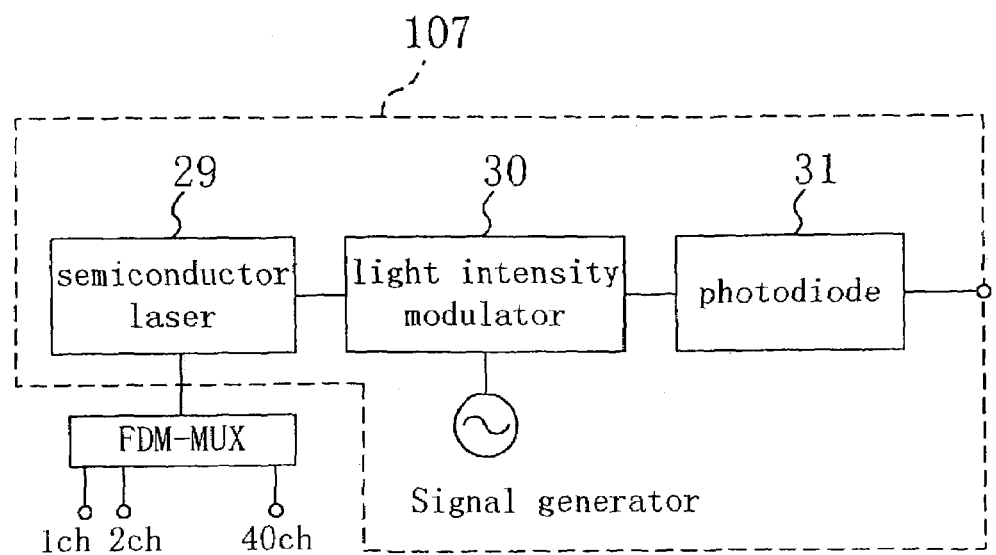
FIG. 7 is a block diagram illustrating an arrangement in the third embodiment of the signal converter according to the present invention.

Hereinafter, the third embodiment of the signal converter according to the present invention will be described with reference to FIG. 7.

In the signal converter 107 in the third embodiment, a semiconductor laser (laser light source) 29; a light intensity modulator 30 for modulating the intensity of laser light; and a photodiode (light receiver) 31 for converting an optical signal into an electrical signal are serially connected to each other in this order. As shown in FIG. 7, the number of the semiconductor laser 29 provided in the signal converter 107 is one and the signal conversion is performed by using only the laser light emitted from the semiconductor laser 29. The semiconductor laser 29 is a DFB laser emitting light on the wavelength band of 1.55 μm and having an oscillation frequency $\omega_1$ of $1.94 \times 10^{14}$ Hz and a spectral line width of 100 kHz.

The frequency of the output light of the semiconductor laser 29 is modulated (FM modulated) with a 40-channel AM video signal superimposed with the driving current of the semiconductor laser 29. The 40-channel AM video signal is generated by an FDM-MUX. The oscillation frequency of a semiconductor laser is variable in proportion to the level of the driving current thereof (chirping characteristic). By utilizing this characteristic, the frequency of the output light of the semiconductor laser is modulated in this embodiment. However, if the level of the driving current changes, then the intensity of the output light also changes correspondingly and the optical signal is distorted. Such a distortion can be removed by the method to be described later.

The intensity of the output light of the frequency-modulated semiconductor laser 29 is modulated by the light intensity modulator 30 with a sine wave signal having a frequency $\omega_F$=3 GHZ. The output light of the light intensity modulator 30 is received by the photodiode 31. A microwave signal, obtained by modulating the frequency of a carrier signal having a frequency $\omega$=3 GHz with the 40-channel AM video signal, is output from the photodiode 31.

In this embodiment, the semiconductor laser is directly subjected to the frequency modulation in this manner. Accordingly, the signal converter in this embodiment does not require the light phase modulator shown in FIG. 3 and has a simpler configuration. Since an amplifier is required for a light phase modulator to operate, the power consumption is generally increased. Accordingly, if the light phase modulator is not necessary, the power consumption can be reduced for that part.

Embodiment 4 of Signal Converter

Figure 8:
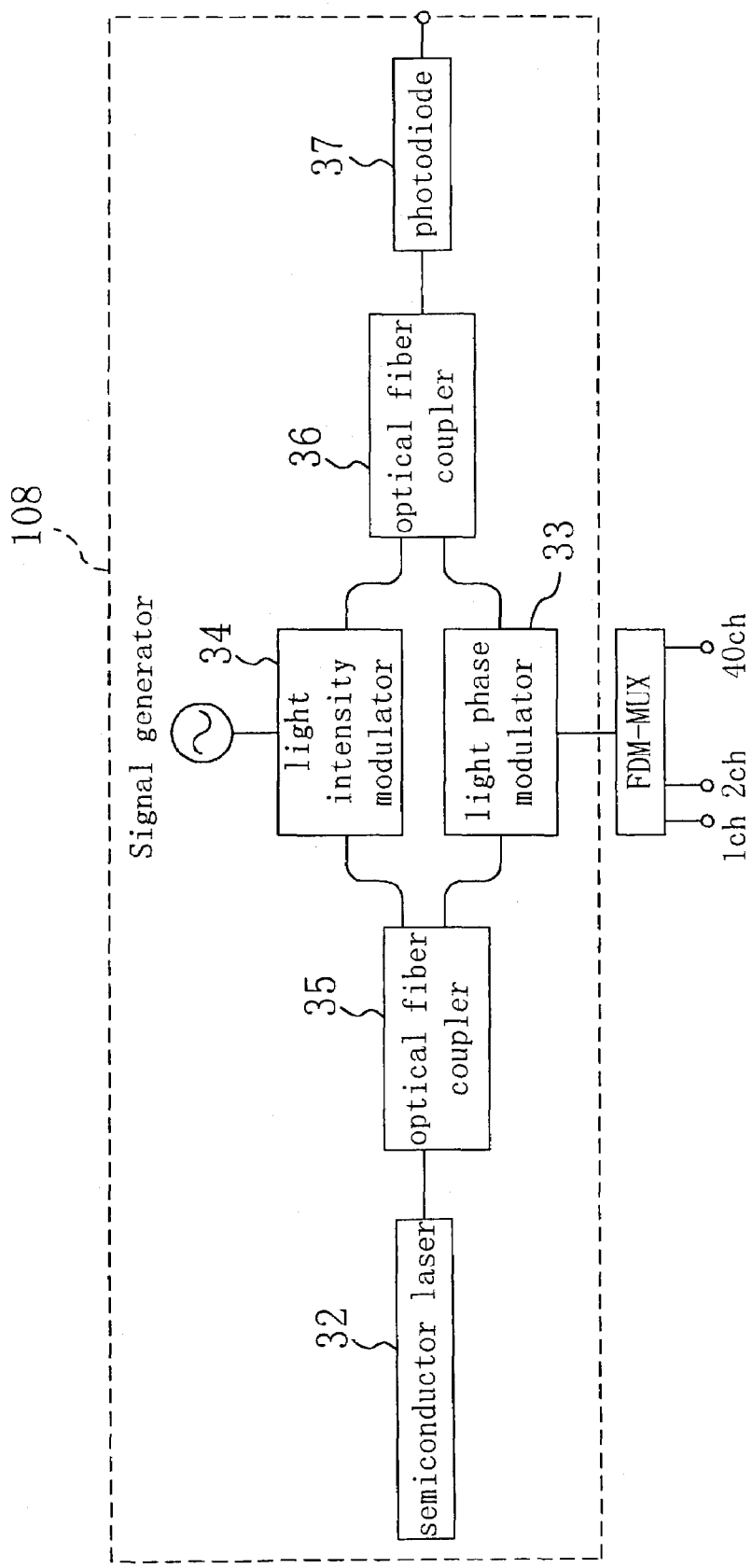
FIG. 8 is a block diagram illustrating an arrangement in the fourth embodiment of the signal converter according to the present invention.

Hereinafter, the fourth embodiment of the signal converter according to the present invention will be described with reference to FIG. 8.

In the signal converter 108 in the fourth embodiment, laser light emitted from a semiconductor laser (laser light source) 32 is divided by a first optical coupler (optical fiber coupler) 35 into two luminous fluxes. One of the two luminous fluxes is supplied to a light phase modulator 33 for modulating the phase of the laser light. And the phase of the luminous flux is modulated with the 40-channel AM video signal. The other luminous flux is supplied to a light intensity modulator 34 for modulating the intensity of the laser light. And the intensity of the luminous flux is modulated with the sine wave signal having a frequency of 3 GHz. The output light of the light phase modulator 33 and the output light of the light intensity modulator 34 are coupled with each other by a second optical fiber coupler 36 and then received by a photodiode (light receiver) 37. A microwave signal, obtained by modulating the phase of a carrier signal having a frequency of 3 GHz with the 40-channel AM video signal, is output from the photodiode 37. As shown in FIG. 8, the number of the semiconductor laser 32 provided in the signal converter 108 is one and the signal conversion is performed by using only the laser light emitted from the semiconductor laser 32. The semiconductor laser 32 is a DFB laser emitting light on the wavelength band of 1.55 μm and having an oscillation frequency $\omega_1$ of $1.94 \times 10^{14}$ Hz and a spectral line width of 100 kHz.

In this embodiment, the phase noises of the luminous fluxes, branched from the outgoing laser light of the semiconductor laser 32, are mixed with each other in the photodiode 37 while being correlated with each other. Accordingly, the phase noise of the semiconductor laser 32 is canceled. As a result, a microwave signal with a high purity can be obtained and a high CNR is attained.

Embodiment 5 of Signal Converter

Figure 9:
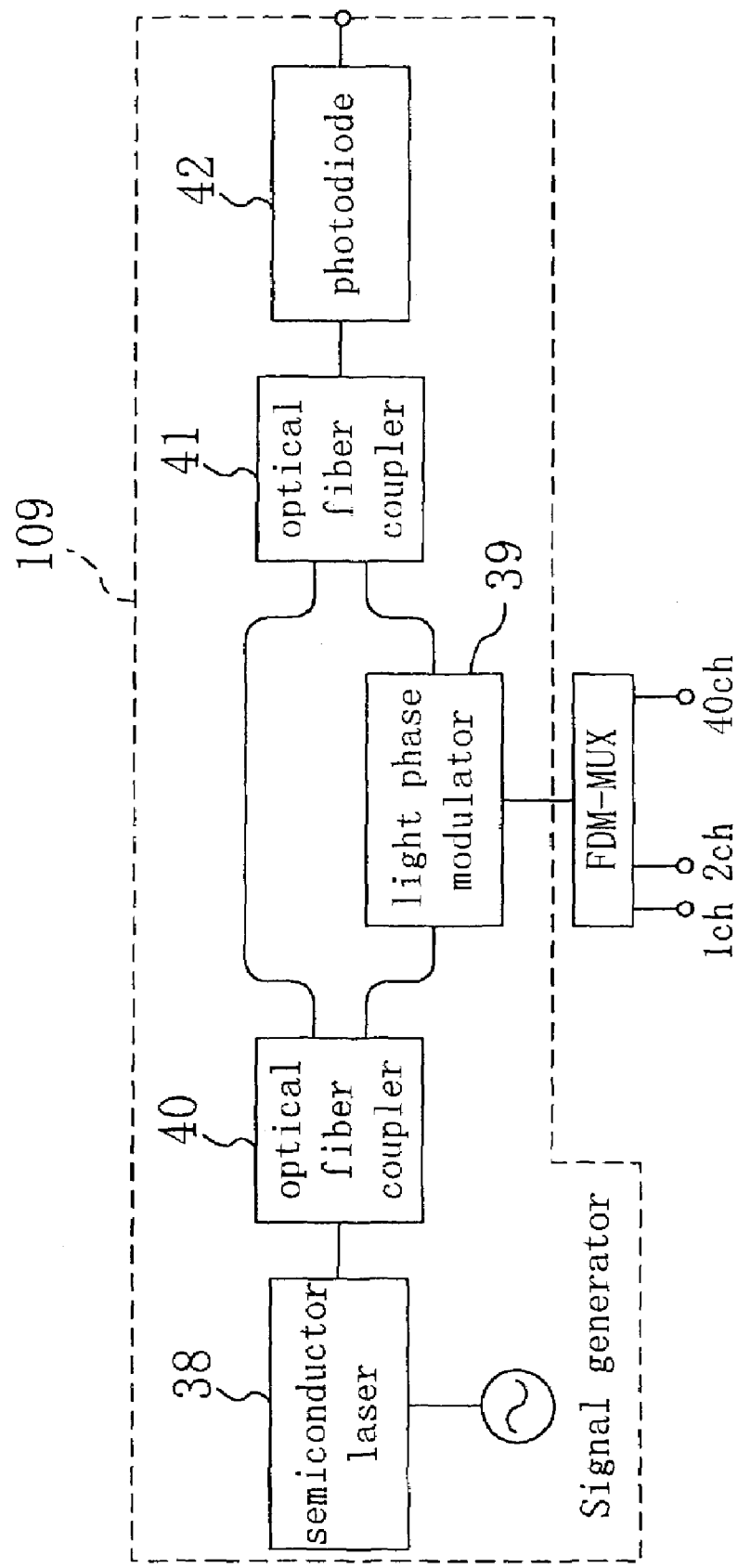
FIG. 9 is a block diagram illustrating an arrangement in the fifth embodiment of the signal converter according to the present invention.

Hereinafter, the fifth embodiment of the signal converter according to the present invention will be described with reference to FIG. 9.

In the signal converter 109 in the fifth embodiment, the intensity of the output light of a semiconductor laser (laser light source) 38 is modulated with a sine wave signal having a frequency of 3 GHz, which is superimposed with the driving current of the semiconductor laser 38. The intensity-modulated laser light is divided by a first optical fiber coupler 40 into two luminous fluxes. One of the two luminous fluxes is supplied to a light phase modulator 39 for modulating the phase of the laser light. And the phase of the luminous flux is modulated with the 40-channel AM video signal. The other luminous flux is directly supplied to a second optical fiber coupler 41 and coupled with the output light of the light phase modulator 39. The coupled light is received by a photodiode (light receiver) 42. A microwave signal, obtained by modulating the phase of a carrier signal having a frequency of 3 GHz with the 40-channel AM video signal, is output from the photodiode 42. As shown in FIG. 9, the number of the semiconductor laser 38 provided in the signal converter 109 is one and the signal conversion is performed by using only the laser light emitted from the semiconductor laser 38. The semiconductor laser 38 is a DFB laser emitting light on the wavelength band of 1.55 μm and having an oscillation frequency $\omega_1$ of $1.94 \times 10^{14}$ Hz and a spectral line width of 100 kHz.

In this embodiment, the phase noises of the luminous fluxes, branched from the outgoing laser light of the semiconductor laser 38, are also mixed with each other in the photodiode 42 while being correlated with each other. Accordingly, the phase noise of the semiconductor laser 38 is canceled. As a result, a microwave signal with a high purity can be obtained and a high CNR is attained. In addition, since the light intensity modulator is not necessary in this embodiment, the configuration can be simplified.

Embodiment 6 of Signal Converter

Figure 10:
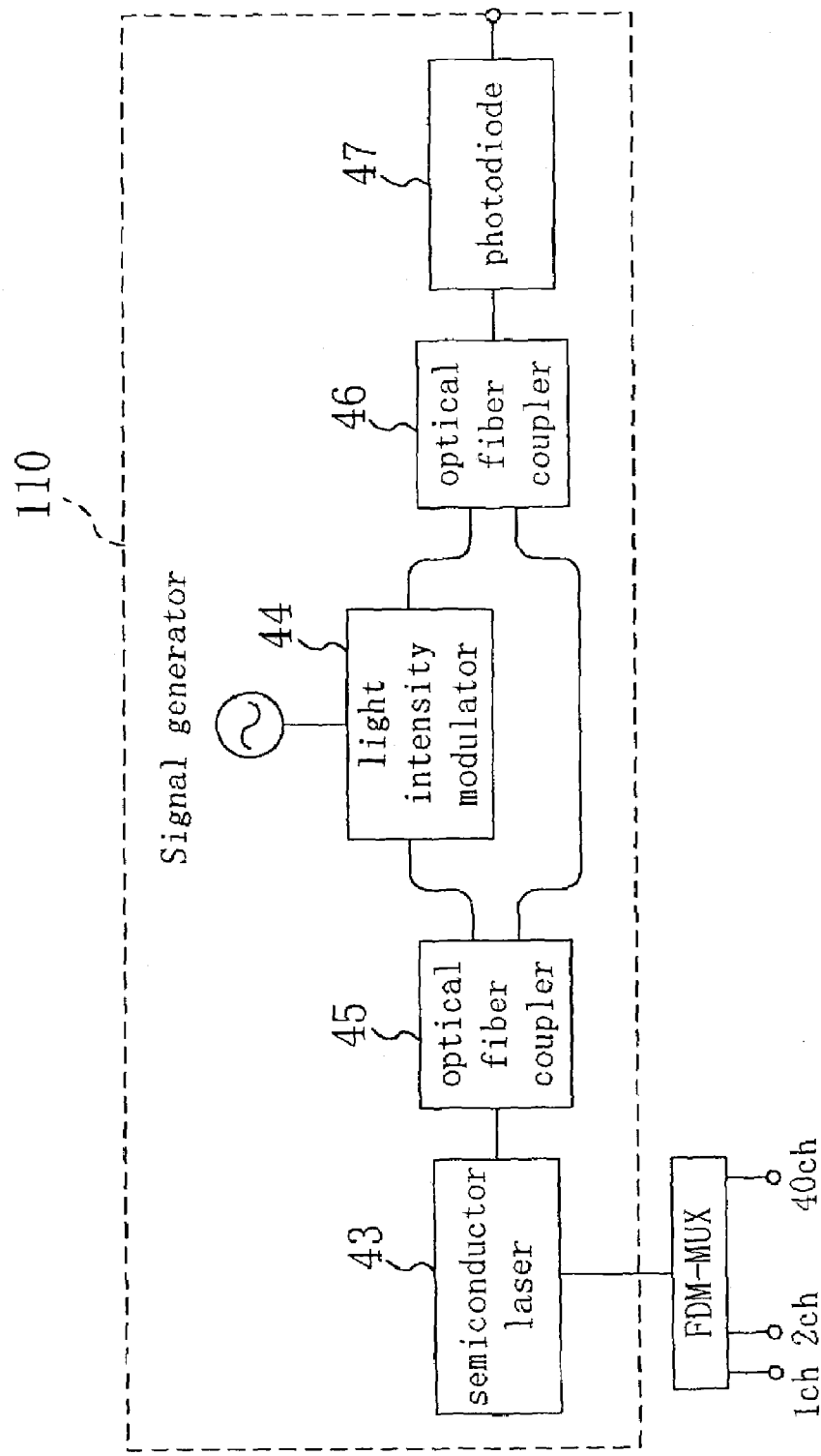
FIG. 10 is a block diagram illustrating an arrangement in the sixth embodiment of the signal converter according to the present invention.

Hereinafter, the sixth embodiment of the signal converter according to the present invention will be described with reference to FIG. 10.

In the signal converter 110 in the sixth embodiment, the frequency of the output light of a semiconductor laser (laser light source) 43 is modulated with a 40-channel AM video signal superimposed with the driving current of the semiconductor laser 43. The frequency-modulated laser light is branched by a first optical fiber coupler 45 into two luminous fluxes. One of the two luminous fluxes is supplied to a light intensity modulator 44 for modulating the intensity of the laser light. And the intensity of the luminous flux is modulated with a sine wave signal having a frequency of 3 GHz. The other luminous flux is directly supplied to a second optical fiber coupler 46 and coupled with the output light of the light intensity modulator 44. The coupled light is received by a photodiode (light receiver) 47. A microwave signal, obtained by modulating the frequency of a carrier signal having a frequency of 3 GHz with the 40-channel AM video signal, is output from the photodiode 47. As shown in FIG. 10, the number of the semiconductor laser 43 provided in the signal converter 110 is one and the signal conversion is performed by using only the laser light emitted from the semiconductor laser 43. The semiconductor laser 43 is a DFB laser emitting light on the wavelength band of 1.55 μm and having an oscillation frequency $\omega_1$ of $1.94 \times 10^{14}$ Hz and a spectral line width of 100 kHz.

In this embodiment, the phase noises of the luminous fluxes, branched from the outgoing laser light of the semiconductor laser 43, are also mixed with each other in the photodiode 47 while being correlated with each other. Accordingly, the phase noise of the semiconductor laser 43 is canceled. As a result, a microwave signal with a high purity can be obtained and a high CNR is attained. In addition, since the light phase modulator is not necessary in this embodiment, the configuration can be simplified. Accordingly, the power consumption can be reduced for that part.

Embodiment 7 of Signal Converter

Figure 11:
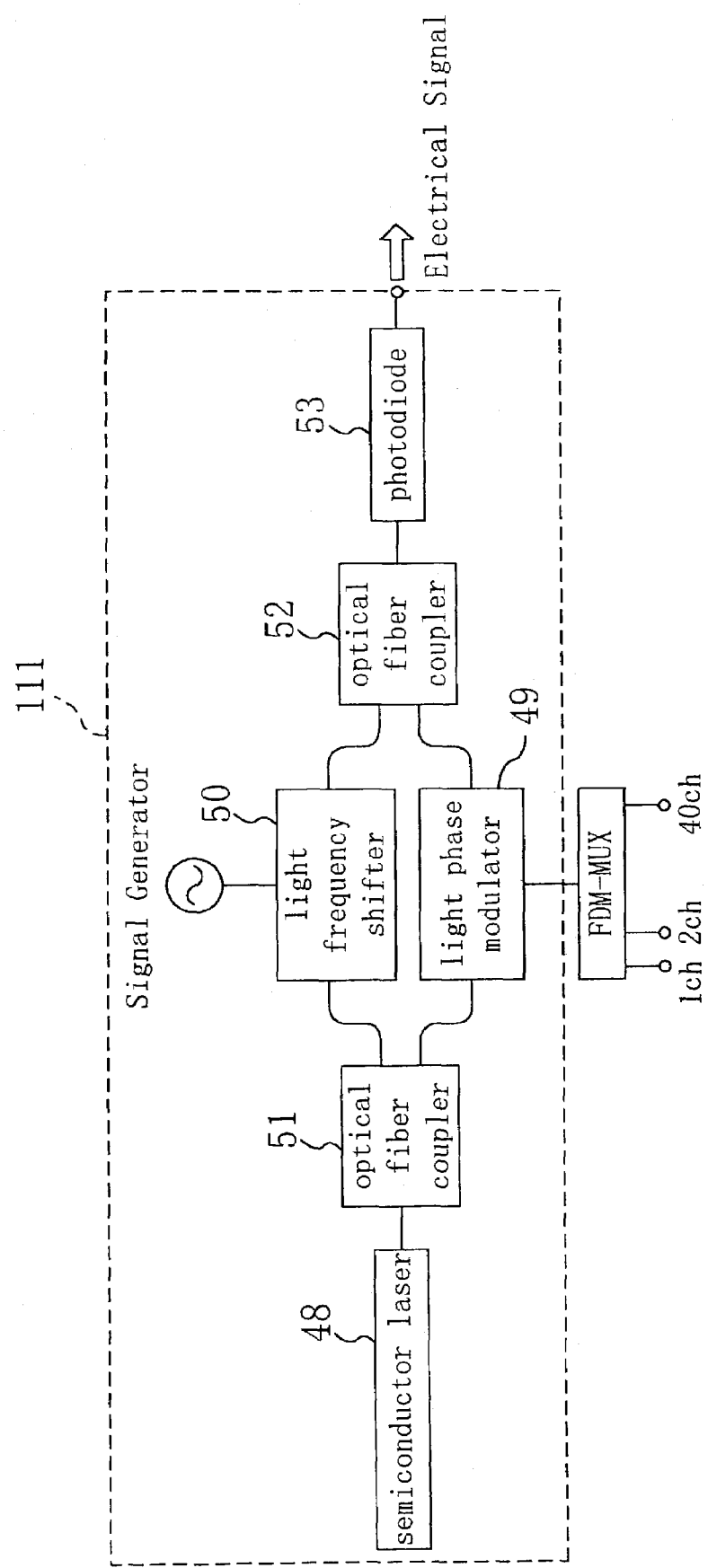
FIG. 11 is a block diagram illustrating an arrangement in the seventh embodiment of the signal converter according to the present invention.

Hereinafter, the seventh embodiment of the signal converter according to the present invention will be described with reference to FIG. 11.

In the signal converter 111 in the seventh embodiment, the output light of a semiconductor laser (laser light source) 48 is branched by a first optical fiber coupler 51 into two luminous fluxes. One of the two luminous fluxes is supplied to a light phase modulator 49 for modulating the phase of the laser light. And the phase of the luminous flux is modulated with the 40-channel AM video signal. The other luminous flux is supplied to a light frequency shifter 50 for shifting the frequency of the laser light by 3 GHz.

The output light of the light phase modulator 49 and the output light of the light frequency shifter 50 are coupled with each other by a second optical fiber coupler 52 and then received by a photodiode (light receiver) 53. A microwave signal, obtained by modulating the phase of a carrier signal having a frequency of 3 GHz with the 40-channel AM video signal in accordance with heterodyne detection, is output from the photodiode 53. As shown in FIG. 11, the number of the semiconductor laser 48 provided in the signal converter 111 is one and the signal conversion is performed by using only the laser light emitted from the semiconductor laser 48. The semiconductor laser 48 is a DFB laser emitting light on the wavelength band of 1.55 μm and having an oscillation frequency $\omega_1$ of $1.94 \times 10^{14}$ Hz and a spectral line width of 100 kHz.

In this embodiment, the phase noises of the luminous fluxes, branched from the outgoing laser light of the semiconductor laser 48, are also mixed with each other in the photodiode 53 while being correlated with each other. Accordingly, the phase noise of the semiconductor laser 48 is canceled. As a result, a microwave signal with a high purity can be obtained and a high CNR is attained. In addition, heterodyne detection using non-modulated light is employed instead of mixing using a signal modulated with a microwave. As a result, a signal can be converted with higher efficiency.

Figure 12:
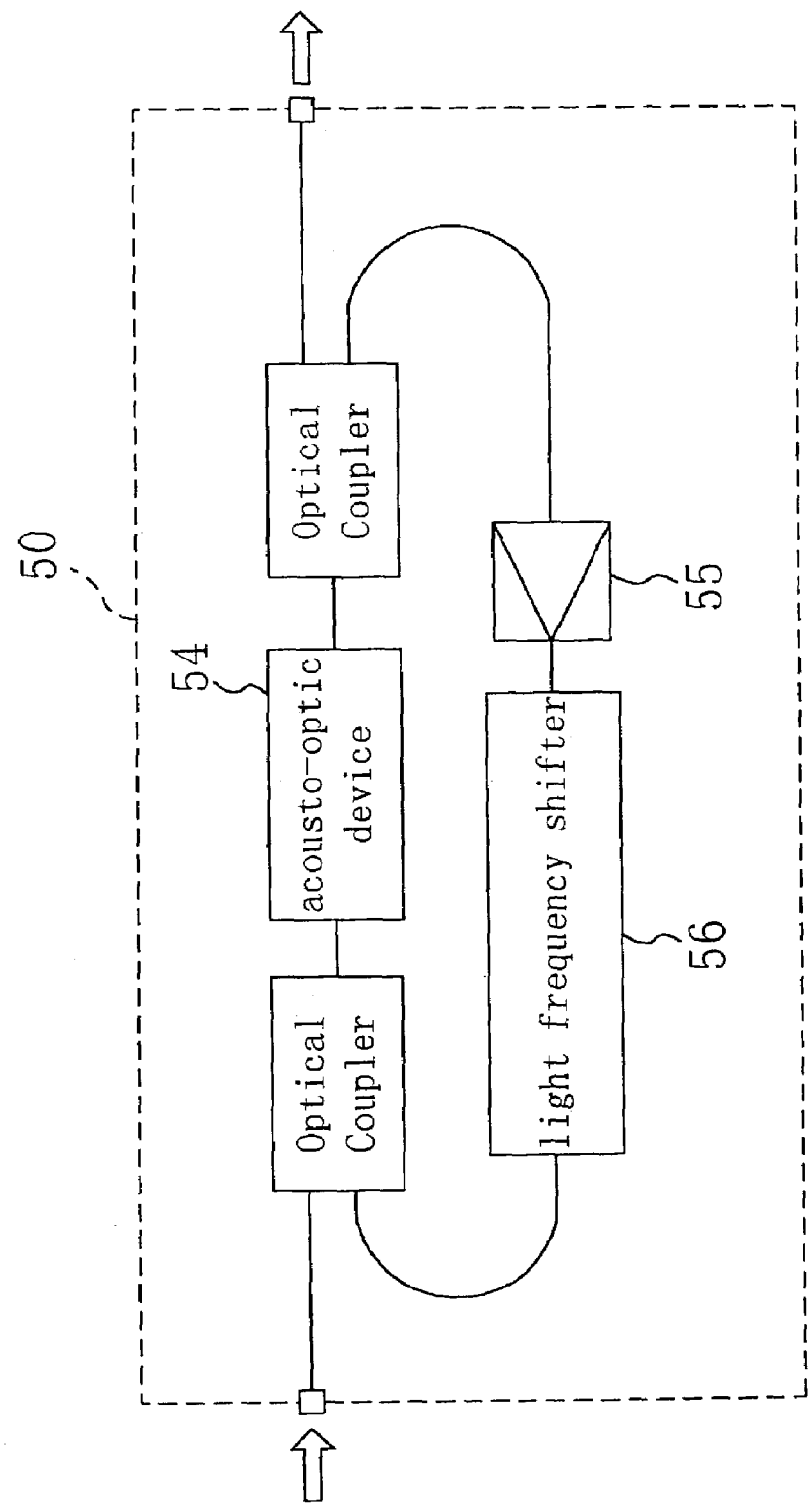
FIG. 12 is a block diagram illustrating an exemplary arrangement for a light frequency shifter used in the signal converter shown in FIG. 11.

The light frequency shifter 50 of this embodiment includes an acousto-optic element 54 and a feedback loop for feeding the output light of the acousto-optic element 54 back to the input as shown in FIG. 12. If an optical fiber amplifier 55 and a light frequency filter 56 are inserted into the feedback loop, then the level of the optical signal, the frequency of which has been shifted, can be increased. As a result, even higher signal conversion efficiency is attained.

Next, it will be described why higher signal conversion efficiency is attained in this embodiment.

The electric field $E_3$ of the output light of the semiconductor laser 48 is given by the following equation:

$$E_3 = E_{30} \cos\{\omega_1 t + \Delta\Phi_1(t)\}$$

If the frequency is shifted by the frequency shifter 50 by $\omega_{IF}$, then the electric field is represented as follows:

$$E_4 = E_{40} \cos\{(\omega_1 - \omega_{IF})t + \Delta\Phi_1(t)\}$$

On the other hand, the output light of the semiconductor laser 48 is converted by the light phase converter 49 into light having an electric field $E_5$ represented by the following equation:

$$E_5 = E_{50} \cos\{\omega_1 t + m \cos \omega_m t + \Delta\Phi_1(t)\}$$

The intensity obtained by coupling the light having the electric field $E_4$ with the light having the electric field $E_5$ in the optical fiber coupler 52 is represented as follows:

$$(E_6)^2 = (E_4 + E_5)^2 = (E_{40})^2 + (E_{50})^2 + E_{40}E_{50} \cos\{\omega_{IF}t - m \cos \omega_m t + \Delta\Phi_1(t) - \Delta\Phi_1(t)\}$$

Since $\Delta\Phi_1(t) - \Delta\Phi_1(t) = 0$, this equation can be further modified as follows:

$$(E_6)^2 = E_{40}E_{50} \cos(\omega_{IF}t - m \cos \omega_m t)$$

As can be understood from this equation, since only one semiconductor laser is used in this embodiment, $\Delta\Phi_1(t)$, specific to a semiconductor laser 48, can be erased.

In all the foregoing embodiments of the signal converter, if a phase modulation system is employed, then the information of a video signal is included as phase-modulated quantity. Accordingly, in such a case, a phase demodulator should be provided for an optical receiver. However, if an integrator for a video signal on a channel is additionally provided for a signal converter, a microwave signal having had the phase thereof modulated with a multichannel video signal can be converted into a signal equivalent to a microwave signal having had the frequency thereof modulated with the multichannel video signal. Accordingly, even when a signal converter employing a phase modulation system is used, a microwave signal having had the frequency thereof modulated with the 40-channel AM video signal can be generated. Then, there is no need to provide any phase demodulator for an optical receiver, and an optical receiver can be formed by using a conventional FM demodulator.

Figure 13A:
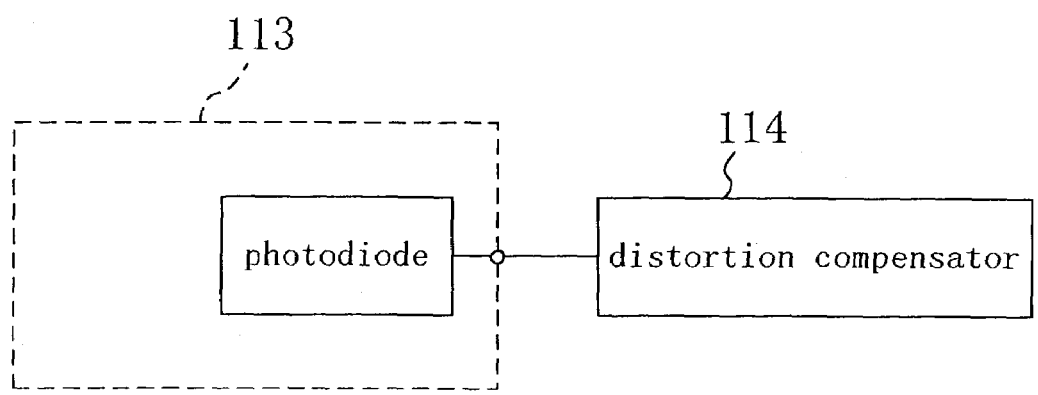
FIG. 13A is a block diagram illustrating a relationship between a signal converter and a distortion compensator.
Figure 13B:
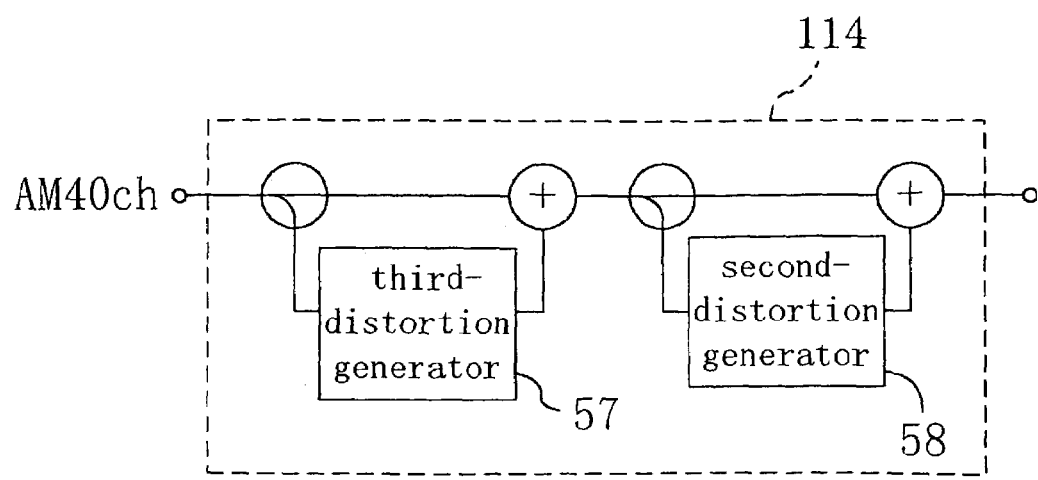
FIG. 13B is a block diagram illustrating the internal configuration of the distortion compensator.

FIGS. 13A and 13B illustrate a distortion compensator for a multichannel video signal. By additionally providing this distortion compensator 114 for a signal converter 113, which is equivalent to any of the signal converters described above, the second and third distortions can be reduced.

In the distortion compensator 114 shown in FIG. 13B, the outputs of a third-distortion generator 57 and a second-distortion generator 58 are added to a microwave signal output from the photodiode in the signal converter 113. As a result, the second and third distortions are removed from the microwave signal. The second and third distortions are distortions resulting from a second harmonic and a third harmonic, respectively, for a video signal on each channel. The second-distortion and third-distortion generators 58, 57 generate similar distortions to these and add the distortions having inverted phases to the microwave signal, thereby canceling the distortion components of the microwave signal. As a result, low distortion characteristics are realized for a video signal. A nonlinear element used in the distortion generator for generating distortion may be a GaAs-FET.

Figure 14:
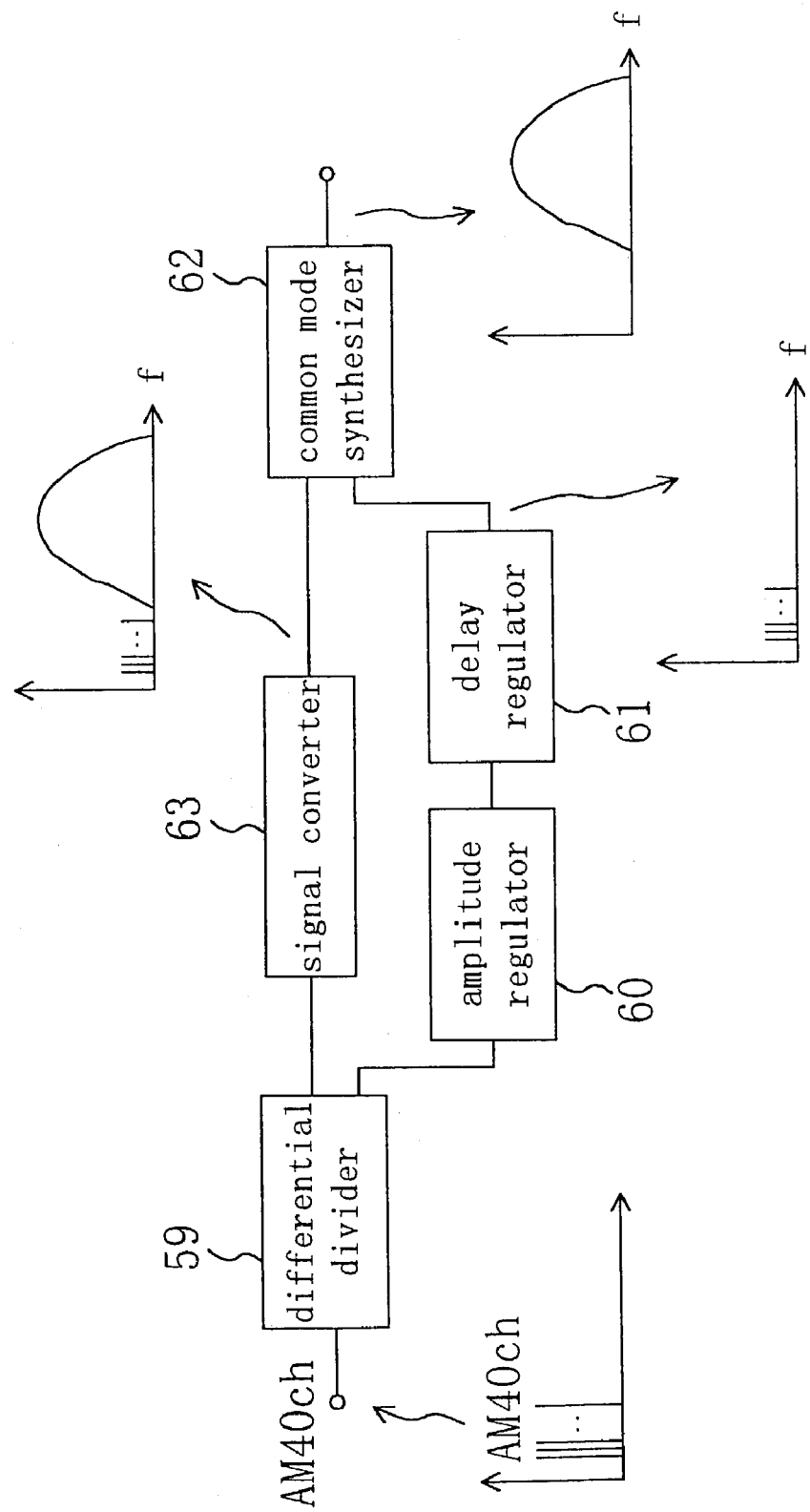
FIG. 14 is a block diagram illustrating an embodiment of the intensity-modulated component suppressing circuit of the present invention.

In modulating the frequency of the output light of a semiconductor laser in a signal converter with a 40-channel video signal, the intensity of the output light is unintentionally modulated during the frequency modulation. Thus, intensity-modulated components are unexpectedly contained in the output of the signal converter. FIG. 14 illustrates a circuit for suppressing the intensity-modulated components. In the circuit shown in FIG. 14, first, a 40-channel AM video signal is branched by a differential coupler 59 into two components. One of the two components is regulated by an amplitude regulator 60 and a delay regulator 61. As a result, a signal corresponding to the intensity-modulated components of the 40-channel AM video signal is obtained as shown in FIG. 14. The other component is converted by a signal converter 63, equivalent to any of the signal converters in the foregoing embodiments, into a microwave signal including the intensity-modulated components. The output signals of the signal converter 63 and the delay regulator 61 are synthesized with each other by an in-phase combiner 62. In this manner, a microwave signal can be obtained with the intensity-modulated components suppressed (or removed). Also, if a pre-emphasis circuit for a multichannel video signal is additionally provided, then excellent signal conversion is realized with the CNR characteristics equalized on all the channels.

Hereinafter, embodiments of the optical transmitter and the optical fiber transmission system according to the present invention will be described with reference to the accompanying drawings.

Embodiment 1 of Optical Transmitter

Figure 15A:
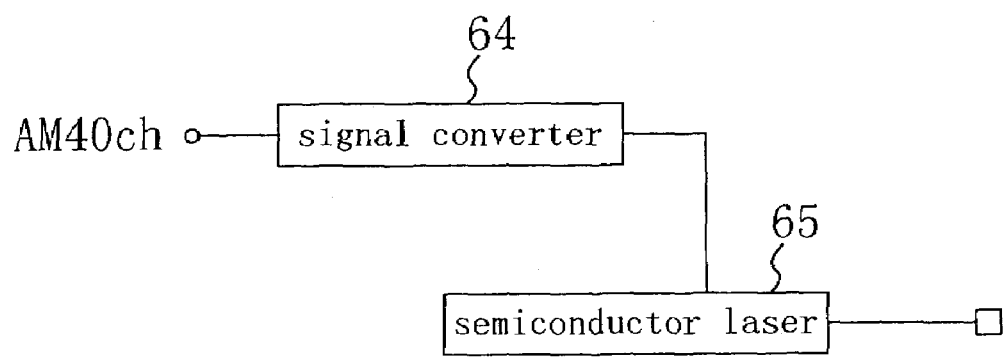
FIG. 15A is a block diagram illustrating an arrangement in the first embodiment of the optical transmitter according to the present invention.

The first embodiment of the optical transmitter according to the present invention will be described with reference to FIGS. 15A and 15B.

The optical transmitter of this embodiment includes: a signal converter 64, equivalent to any of the signal converters in the foregoing embodiments; and a semiconductor laser 65 for transmission. By superimposing the output signal of the signal converter 64 with the driving current of the semiconductor laser 65, the intensity of the output light of the semiconductor laser 65 is modulated. As described above, the output signal of the signal converter 64 is a microwave signal, the frequency of which has been modulated with a 40-channel AM video signal.

Figure 15B:
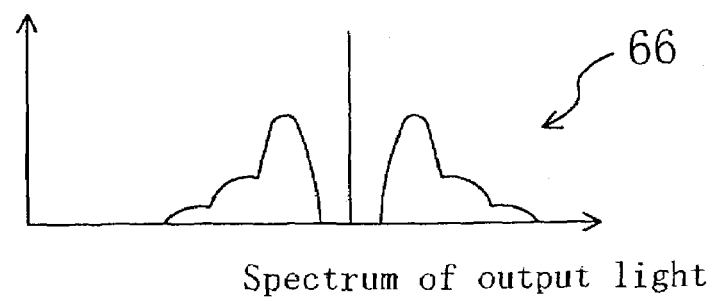
FIG. 15B is a diagram illustrating the spectrum of the output light obtained in the embodiment.

FIG. 15B illustrates the spectrum 66 of the laser output light of the semiconductor laser 65. In this embodiment, a DFB laser, operative at 10 GHz, is used as the semiconductor laser 65 for transmission. Accordingly, intensity modulation is accomplished with less distortion. Since the signal for modulation is superimposed with the driving current of the semiconductor laser 65 in order to modulate the intensity, a chirping phenomenon generates and the oscillation frequency of the semiconductor laser 65 is also modulated. Accordingly, each side band broadens to have a broader bandwidth in the spectrum shown in FIG. 15B. The 40-channel video signal is included in these side bands and can be retrieved by making an optical receiver (not shown) demodulate the signal.

Embodiment 2 of Optical Transmitter

Figure 16A:
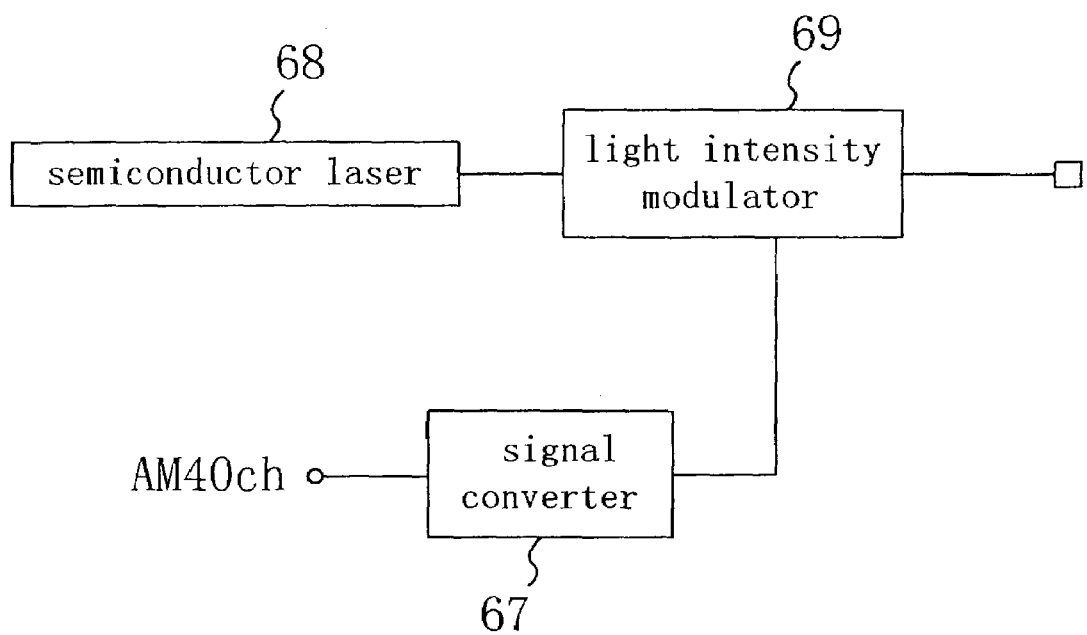
FIG. 16A is a block diagram illustrating an arrangement in the second embodiment of the optical transmitter according to the present invention.

The second embodiment of the optical transmitter according to the present invention will be described with reference to FIGS. 16A and 16B.

The optical transmitter of this embodiment includes: a signal converter 67, equivalent to any of the signal converters in the foregoing embodiments; a semiconductor laser 68 for transmission; and a light intensity modulator 69. In this embodiment, instead of superimposing the output signal of the signal converter 67 with the driving current of the semiconductor laser 68, the intensity of the output light of the semiconductor laser 68 is modulated by using the light intensity modulator 69. The output signal of the signal converter 67 is supplied to the light intensity modulator 69 and the intensity modulation is performed by using this output signal. As described above, the output signal of the signal converter 67 is a microwave signal, the frequency of which has been modulated with a 40-channel AM video signal.

Figure 16B:
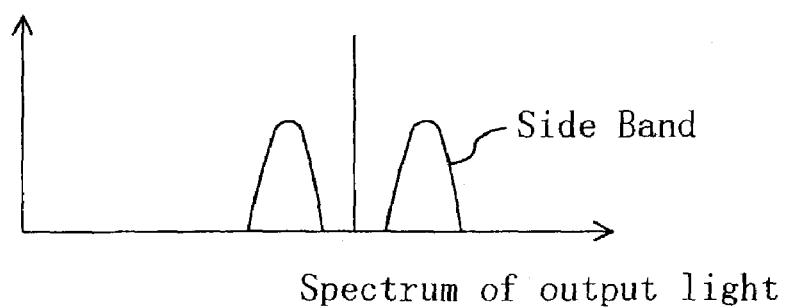
FIG. 16B is a diagram illustrating the spectrum of the output light obtained in the embodiment.

Since the light intensity modulator 69 is used in this embodiment, the width of a side band does not broaden in the spectrum of the optical signal output from the optical transmitter as shown in FIG. 16B. Accordingly, even if an optical signal has been transmitted through an optical fiber, the optical signal is affected less by wavelength dispersion and can be transmitted with higher quality.

Embodiment 3 of Optical Transmitter

Figure 17A:
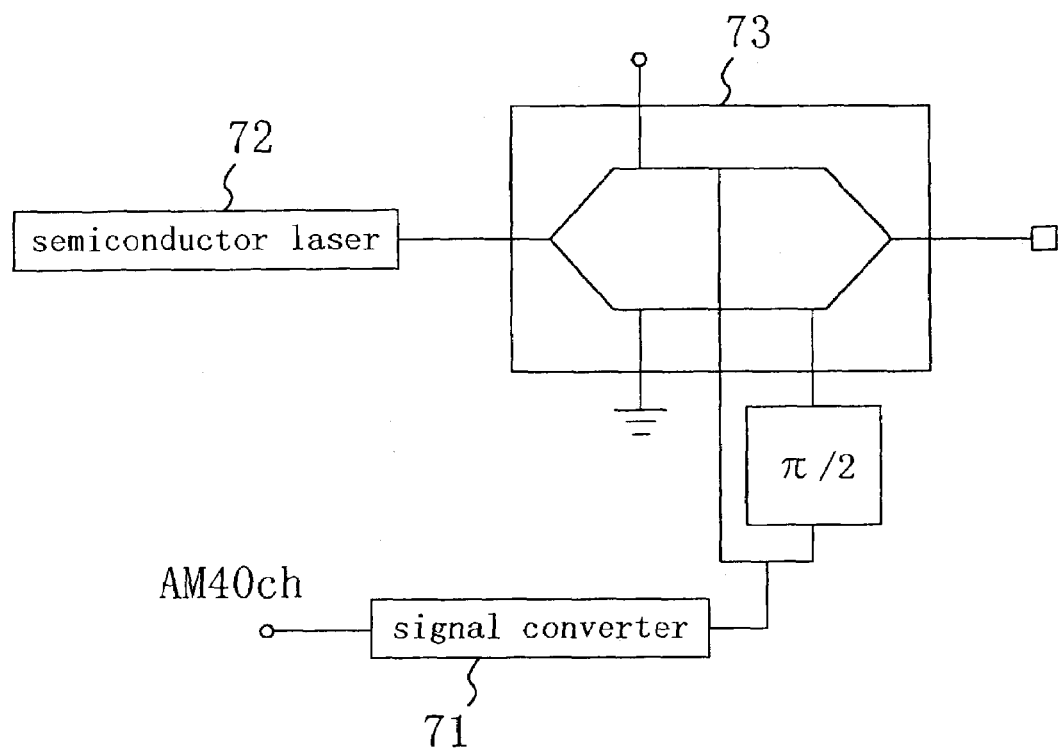
FIG. 17A is a block diagram illustrating an arrangement in the third embodiment of the optical transmitter according to the present invention.
Figure 17B:
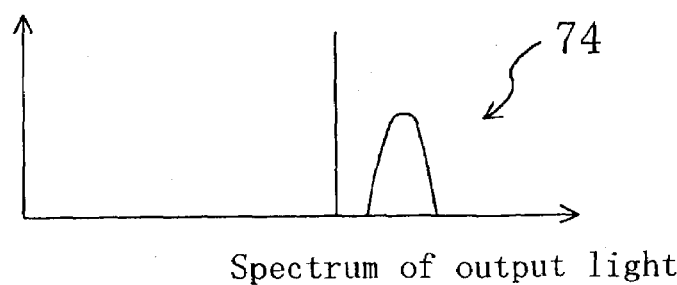
FIG. 17B is a diagram illustrating the spectrum of the output light obtained in the embodiment.

The third embodiment of the optical transmitter according to the present invention will be described with reference to FIGS. 17A and 17B.

The optical transmitter of this embodiment includes: a signal converter 71, equivalent to any of the signal converters in the foregoing embodiments; a semiconductor laser 72 for transmission; and a light intensity modulator 73. In this embodiment, instead of superimposing the output signal of the signal converter 71 with the driving current of the semiconductor laser 72, the intensity of the output light of the semiconductor laser 72 is modulated by using the light intensity modulator 73. The output signal of the signal converter 71 is supplied to the light intensity modulator 73 and the intensity modulation is performed by using this output signal.

The light intensity modulator 73 of this embodiment has a Mach-Zehnder configuration and branches the output of the signal converter 71 into two components. One of the two components is subjected to intensity modulation after the phase thereof has been shifted by $\pi/2$. Phase shifting is not performed on the other component. Accordingly, intensity modulation is performed only on the components on a single side band. Thus, as shown in FIG. 17B, the spectrum 74 of the output light has a narrower bandwidth than that of the spectrum shown in FIG. 15B. As a result, the optical signal is affected even less by wavelength dispersion and can be transmitted with higher quality and over a longer distance.

Embodiment of Optical Fiber Transmission System

Hereinafter, an embodiment of the optical fiber transmission system according to the present invention will be described with reference to FIG. 18.

The optical fiber transmission system of this embodiment includes: an optical transmitter 75, equivalent to any of the optical transmitters in the foregoing embodiments; optical fiber amplifiers (erbium-doped fiber amplifiers) 76a, 76b, 76c; optical fiber couplers 77; an optical fiber 78 for transmission; and an optical receiver 79. The optical fiber amplifiers 76a, 76b, 76c, the optical fiber couplers 77 and the optical fiber 78 for transmission may have known structures or configurations. If the optical signal output by the optical transmitter 75 carries a microwave signal having had the phase thereof modulated with a 40-channel video signal, then the optical receiver 79 should include a phase demodulator. On the other hand, if the optical signal output by the optical transmitter 75 carries a microwave signal having had the frequency thereof modulated (FM modulated) with a 40-channel video signal, then the optical receiver 79 may use a conventional FM demodulator.

The optical signal output from the optical transmitter 75 is amplified by the optical fiber amplifiers 76a through 76c and branched by the optical fiber couplers 77. The branched optical signal is transmitted through the optical fiber 78 for transmission and received by the optical receiver 79. In the optical receiver 79, the received optical signal is demodulated into a multichannel video signal.

In this embodiment, a multichannel video signal is transmitted after the frequency or the phase thereof has been modulated. Accordingly, the minimum light receiving level is decreased and the resistance to reflection and wavelength dispersion is increased. Moreover, the line width of a microwave signal for carrying a multichannel video signal is narrow and the frequency is stable. Thus, multichannel video information can be distributed with a high CNR and low distortion.

In this embodiment, the wavelength of the output light of the optical transmitter is on the band of 1.55 μm. Alternatively, the wavelength of the output light may be on the band of 1.3 μm. In such a case, a praceodymium-doped fiber amplifier is preferably used as the optical fiber amplifier.

Embodiment of Optical Signal Converter

Hereinafter, an embodiment of the optical signal converter according to the present invention will be described with reference to FIG. 19.

The optical signal converter of the present invention receives an optical signal carrying a sub-carrier (microwave signal), the frequency of which has been modulated with a multichannel video signal, and performs optical conversion processing required for performing FM/AM conversion on the optical signal. The optical signal, subjected to such processing, is output from the optical signal converter and then irradiated to a photoelectric transducer such as a photodiode. And as the output of the photoelectric transducer, a multichannel video signal (i.e., an amplitude-modulated electrical signal) is obtained.

Figure 19:
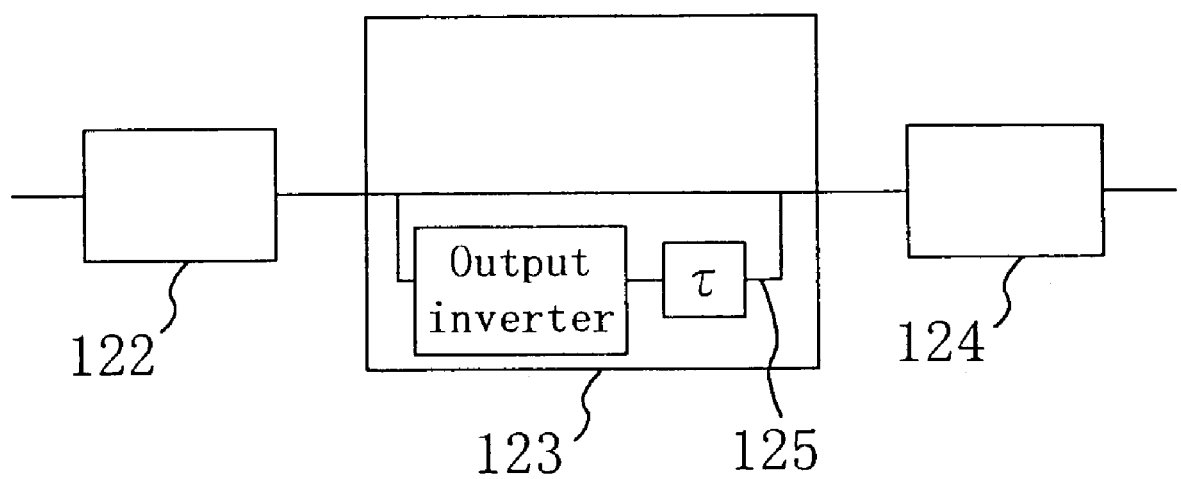
FIG. 19 is a block diagram illustrating an arrangement in an embodiment of the optical signal converter according to the present invention.

The signal converter shown in FIG. 19 includes an optical output limiter 122 for outputting an optical signal with an intensity saturated at a certain level in response to an optical signal having an intensity exceeding a predetermined level (threshold value). As the optical output limiter 122, a semiconductor laser having a saturable absorption region can be used, for example. The optical input/output characteristics of a semiconductor laser having a saturable absorption region are of a differential nature. Accordingly, only if light having an intensity exceeding a certain threshold level has been input, an optical output of several milliwatts (mW) can be obtained.

Figure 20A:
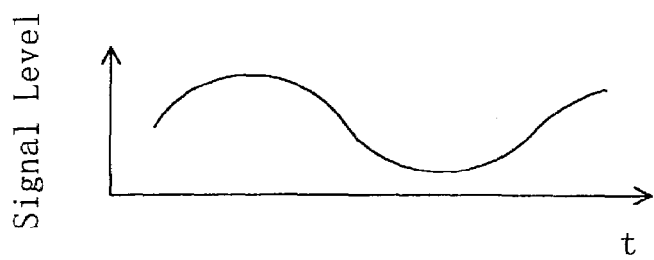
FIG. 20A is a waveform chart of a multichannel signal in the embodiment of the optical signal converter according to the present invention.
Figure 20B:
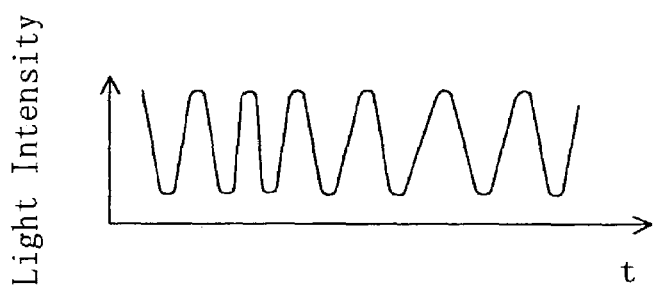
FIG. 20B is a waveform chart illustrating the variation in intensity of input optical signal.

In the signal converter of this embodiment, an optical signal, which has been propagated through an optical fiber, is first input to the optical output limiter 122. The intensity of the input optical signal has a waveform shown in FIG. 20B, and the optical signal carries a multichannel video signal having a waveform shown in FIG. 20A. More specifically, the optical signal shown in FIG. 20B is obtained by modulating the intensity of laser light with a sub-carrier in a microwave region (e.g., at a frequency of 3 GHz), the frequency of which has been modulated with a multichannel video signal. The multichannel video signal is an analog signal generated by a multichannel signal generator (FDM-MUX) for performing frequency division multiplexing on video information on 40 channels, for example. The carrier for the 40 channels is located in the range from 90 MHz to 330 MHz on the axis of frequencies with an interval of 6 MHz, for example.

Figure 18:
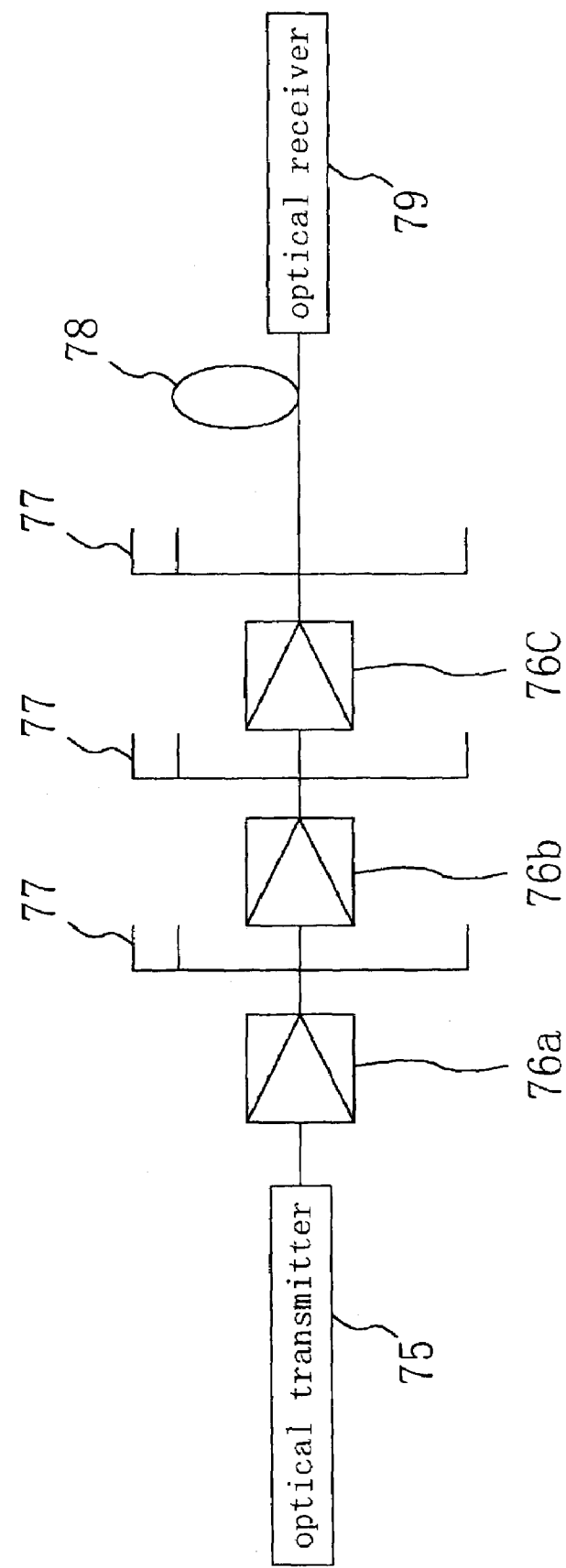
FIG. 18 is a block diagram illustrating an arrangement in an embodiment of the optical fiber transmission system according to the present invention.

Such an optical signal, the intensity of which has been modulated with a sub-carrier having had the frequency thereof modulated with a multichannel signal, is generated by the optical transmitter shown in FIG. 18.

Figure 20C:
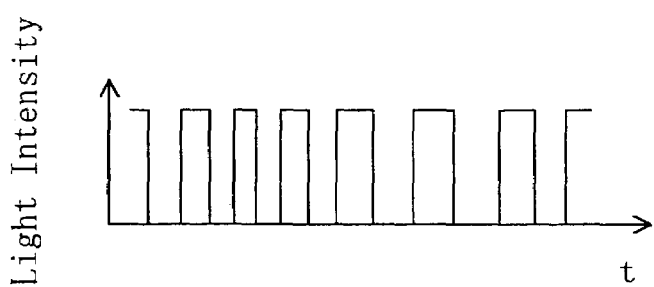
FIG. 20C is a waveform chart illustrating the output waveform of a light output limiter.

If the optical signal input to the optical output limiter 122 has a high intensity exceeding a threshold level, then the optical output limiter 122 outputs light having a constant intensity. On the other hand, if the input optical signal has an intensity lower than the threshold level, then the output of the optical output limiter 122 is substantially zero. Accordingly, the output of the optical output limiter 122 is represented as, an optical pulse train (first optical pulse train) as shown in FIG. 20C. As can be understood from FIG. 20C, while part of the waveform representing the intensity of the input optical signal (FIG. 20B) having relatively low frequency components is input to the optical output limiter 122, optical pulses having relatively large widths are output from the optical output limiter 122 at broad time intervals. On the other hand, while part of the waveform representing the intensity of the input optical signal having relatively high frequency components is input to the optical output limiter 122, optical pulses having relatively narrow widths are output from the optical output limiter 122 at narrow time intervals. The interval of an optical pulse train is determined by the frequency (sub-carrier frequency: 3 GHz, for example) of the waveform shown in FIG. 20B. If the sub-carrier frequency is 3 GHz and the bandwidth is 4 GHz, for example, then the interval of an optical pulse train is in the range from 0.2 ns to 1.0 ns. The average width of optical pulses in a train is variable by adjusting the "threshold value" turning ON/OFF the optical output limiter 122. However, in general, the average width is at most equal to an average optical pulse interval.

Figure 20D:
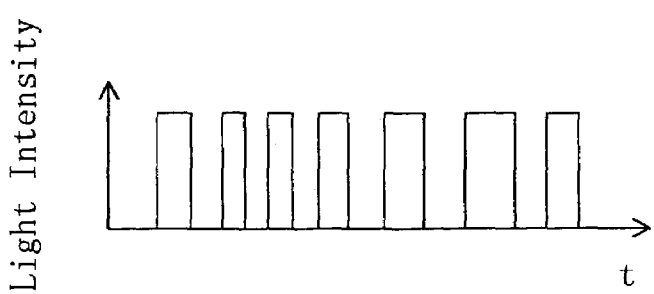
FIG. 20D is a waveform chart illustrating the output waveform of an optical delay circuit.

The optical pulse train obtained in this manner is input to an optical delay circuit 123 in the optical signal converter and branched into two as shown in FIG. 19. Branching can be performed by using an Mach-Zehnder interference configuration. One of the branched optical pulse trains passes through a delay path 125. While the optical pulse train is propagated through the delay path 125, the train is inverted by an output inverter and delayed (where a delay time is denoted by $\tau$). As a result, at the end of the delay path 125, an optical pulse train (second optical pulse train) shown in FIG. 20D is obtained. The output inverter may be a semiconductor laser, for example. In such a case, the semiconductor laser, functioning as the output inverter, is disposed on the delay path 125 so as to receive the input optical pulse train while operating to generate continuous waves (CW). It is noted that the semiconductor laser generates continuous waves at a different wavelength from that of the optical pulses received. In this case, if an optical pulse is input to the semiconductor laser, then the gain of the laser is consumed for amplifying the optical pulse, and the output of the semiconductor laser is turned OFF. In this manner, an optical output can be obtained by inverting the input optical pulse train.

The other optical pulse train branched is input to an optical logic element (optical AND gate) 124 without passing through the delay path 125. The optical pulse train, which has passed through the delay path 125, is also input to the optical AND gate 124, which outputs a logical sum of these optical pulse trains (first and second optical pulse trains). The optical AND gate 124 is an element having the same configuration as that of the optical output limiter 122. The "threshold level" of the element is determined such that a total light intensity obtained by adding these two optical inputs together exceeds the "threshold level" and that a light intensity corresponding to one of the optical inputs is lower than the "threshold level".

Figure 20E:
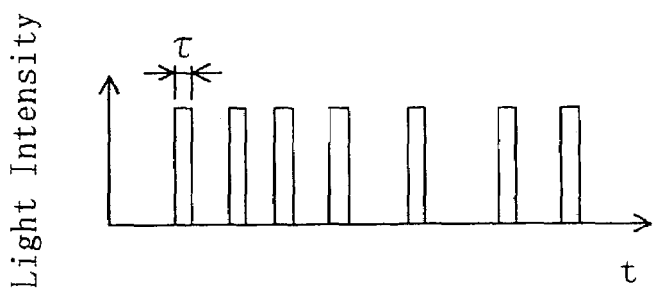
FIG. 20E is a waveform chart illustrating the output waveform of an optical logic element.

The output of the optical AND gate 124 having such a configuration is an optical pulse train (third optical pulse train) having a waveform shown in FIG. 20E. The output of the optical AND gate 124 (third optical pulse train) has an optical pulse width equal to the delay time $\tau$ and an optical pulse interval inversely proportional to the frequency of the input optical signal shown in FIG. 20B. That is to say, the number of optical pulses per unit time is proportional to the modulated frequency of the input optical signal shown in FIG. 20B and to the amplitude of the multichannel video signal shown in FIG. 20A. Accordingly, if the optical pulse train shown in FIG. 20E is photoelectrically transduced by using a photodiode having a response speed sufficiently slower than the optical pulse interval, then a quantity of light obtained by integrating optical pulse trains within a unit time is transduced into an electrical signal. Thus, the electrical signal output from the photodiode has a level proportional to the modulated frequency of the input optical signal. As a result, a signal proportional to the multichannel video signal shown in FIG. 20A is obtained.

An optical pulse train is delayed by differentiating the length of an optical path (optical path length) through which a branched optical pulse train passes. The delay time $\tau$ is set to have a smaller width than the optical pulse width of the optical pulse train shown in FIG. 20C. In this embodiment, the difference of the optical path length is set such that the delay time $\tau$ becomes 90 psec.

As can be understood, the optical signal converter of this embodiment can perform FM/AM conversion in accordance with the states of light and does not require electric devices operating at a high speed. As a result, a high CNR is attained and a signal can be converted with less distortion.

Even if a high-speed operating photodiode and a low pass filter are used in combination instead of using a photodiode having a response speed sufficiently slower than an optical pulse interval, an electrical signal proportional to a multichannel video signal can be obtained from the output (optical signal) of the photoelectric transducer of this embodiment.

As an optical logic element, an optical exclusive-OR element or an optical bistable multivibrator may also be used instead of the optical AND gate 124.

Embodiment of Optical Receiver

Figure 21:
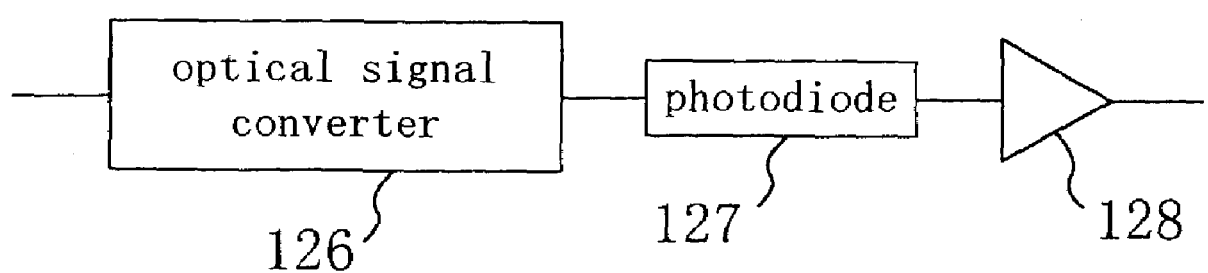
FIG. 21 is a block diagram illustrating an arrangement in an embodiment of the optical receiver according to the present invention.

Hereinafter, an embodiment of the optical receiver according to the present invention will be described with reference to FIG. 21.

The optical receiver of this embodiment includes: the optical signal converter 126 shown in FIG. 19; a photodiode (light receiver) 127 for receiving the output light of the optical signal converter 126 and converting the light into an electrical signal; and an amplifier 128 for amplifying the output of the photodiode 127.

The optical pulse train shown in FIG. 20E is input to the photodiode 127. The photodiode 127 is not necessarily a device operating on a broad band but has only to operate on the band of the multichannel signal. Even if the band of the photodiode 127 is broad, the amplifier 128 can function as a low pass filter. Accordingly, after the amplification has been performed by the amplifier 128, unnecessary high frequency components have been removed and a required multichannel signal can be obtained.

In this embodiment, low-noise and low-distortion devices, which have conventionally been used in a transmission system of a direct modulation and direct detection type, can be used as the photodiode 127 and the amplifier 128. In addition, the number of high-speed devices required can also be reduced. Accordingly, it is possible to prevent noise and distortion characteristics from being deteriorated owing to amplitude deviation, group delay deviation and bandwidth limitation.

Embodiment of Optical Fiber Transmission System

Figure 22:
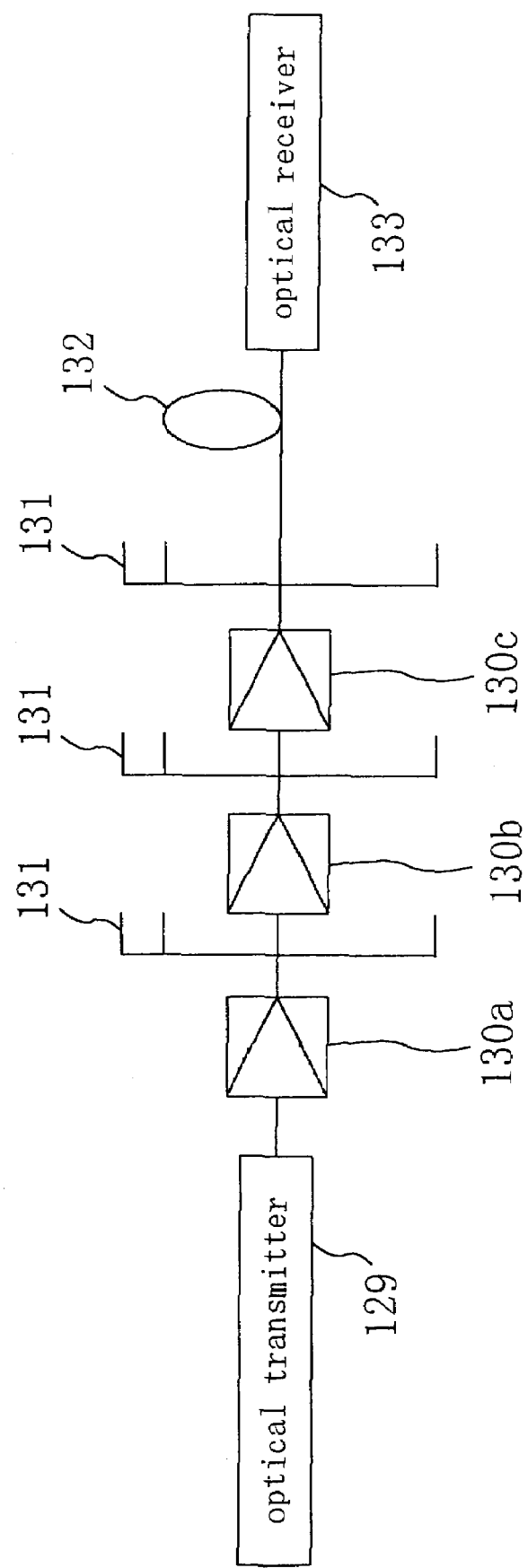
FIG. 22 is a block diagram illustrating an arrangement in another embodiment of the optical fiber transmission system according to the present invention.

Hereinafter, an embodiment of the optical fiber transmission system according to the present invention will be described with reference to FIG. 22.

The optical fiber transmission system of this embodiment includes: an optical transmitter 129 having the same configuration as that of the optical transmitter shown in FIG. 18; optical fiber amplifiers (erbium-doped fiber amplifiers) 130a, 130b, 130c; optical fiber couplers 131; an optical fiber 132 for transmission; and an optical receiver 133 of the foregoing embodiment. The optical fiber amplifiers 130a, 130b, 130c, the optical fiber couplers 131 and the optical fiber 132 for transmission may have known structures or configurations.

The optical signal output from the optical transmitter 129 is amplified by the optical fiber amplifiers 130a through 130c and branched by the optical fiber couplers 131. The branched optical signal is transmitted through the optical fiber 132 for transmission and received by the optical receiver 133. In the optical receiver 133, the received optical signal is demodulated into a multichannel video signal. The optical fiber amplifiers 130 and the optical fiber couplers 131 may be connected to each other on multiple stages.

In this embodiment, an optical signal, the intensity of which has been modulated with a microwave signal having had the frequency thereof modulated with a multichannel video signal, is transmitted through an optical fiber. Accordingly, the minimum light receiving level is decreased and the resistance to reflection and wavelength dispersion is increased. Moreover, since this system includes the optical signal converter described with reference to FIGS. 19 and 20 in the optical receiver, multichannel video information can be distributed with a high CNR and low distortion.

In the optical fiber transmission system of this embodiment, the wavelength of the output light of the optical transmitter is on the band of 1.55 μm. Alternatively, the wavelength of the output light may be on the band of 1.3 μm. In such a case, a praceodymium-doped fiber amplifier is preferably used as the optical fiber amplifier.

This embodiment is a multichanneled optical fiber transmission system. Alternatively, the present invention is naturally applicable to an optical fiber transmission system not including the optical fiber amplifiers 130 and the optical fiber couplers 131.

A signal converter according to the present invention includes: modulation means for modulating the frequency of output light of a laser light source with a multichannel video signal and modulating the intensity of the output light with a microwave signal; and a light receiver for receiving the output light modulated by the modulation means and for outputting the microwave signal having had the phase thereof modulated with the multichannel video signal. Accordingly, a microwave signal exhibiting excellent CNR characteristics free from phase noise can be generated without using any AFC circuit. If a semiconductor laser for transmitting a signal is subjected to intensity modulation by using such a microwave signal, an optical signal suitable for long-distance transmission can be produced.

Another signal converter according to the present invention includes: modulation means for modulating the phase of output light of a laser light source with a multichannel video signal and modulating the intensity of the output light with a microwave signal; and a light receiver for receiving the output light modulated by the modulation means and for outputting the microwave signal having had the phase thereof modulated with the multichannel video signal. Accordingly, a microwave signal exhibiting excellent CNR characteristics free from phase noise can be generated without using any AFC circuit. If a semiconductor laser for transmitting a signal is subjected to intensity modulation by using such a microwave signal, an optical signal suitable for long-distance transmission can be produced.

In an optical transmitter according to the present invention, an output signal of the signal converter of the present invention is superimposed with the driving current of a semiconductor laser for transmission, thereby modulating the intensity of output light of the semiconductor laser with the output signal of the signal converter. Accordingly, an optical signal with a signal bandwidth reduced can be obtained. As a result, resistance to wavelength dispersion can be increased and longer-distance transmission is realized.

In another optical transmitter according to the present invention, a light intensity modulator for transmission modulates the intensity of output light of a semiconductor laser by using an output signal of the signal converter of the present invention. Accordingly, an optical signal, which is less affected by chirping and less distorted, can be obtained.

An optical fiber transmission system according to the present invention includes: the optical transmitter of the present invention; an optical fiber for transmitting an optical signal output from the optical transmitter; and a light receiver for converting the optical signal, transmitted through the optical fiber, into a multichannel video signal. Accordingly, a multichannel video can be distributed with increased resistance to reflection, a higher CNR and lower distortion.

In an optical signal converter according to the present invention, optical pulse trains are output at an interval inversely proportional to the modulated frequency of input optical signal, and the number of optical pulse trains included per unit time is proportional to the amplitude of a multichannel video signal. In the optical signal converter of the present invention, FM/AM conversion is performed in this manner in accordance with the states of light. Accordingly, it is not necessary to perform FM/AM conversion electrically.

An optical receiver according to the present invention includes the optical signal converter. Thus, in demodulating an optical signal, the intensity of which has been modulated with a sub-carrier having had the frequency thereof modulated with a multichannel signal, a low-noise and low-distortion device, which has conventionally been used in a transmission system of a direct modulation and direct detection type, can be used. In addition, the number of high-speed devices required can also be reduced. Accordingly, it is possible to prevent noise and distortion characteristics from being deteriorated owing to amplitude deviation, group delay deviation and bandwidth limitation.

In another optical fiber transmission system according to the present invention, in transmitting an optical signal, the intensity of which has been modulated with a sub-carrier having had the frequency thereof modulated with a multichannel signal, through an optical fiber, the optical receiver is used for demodulating a signal. Accordingly, the minimum light receiving level can be decreased and resistance to reflection to and wavelength dispersion can be increased by leaps and bounds. In addition, a high CNR can be obtained.

What is claimed is:

1. A signal converter for receiving a multichannel video signal and converting the video signal into a microwave signal, the frequency of which has been modulated with the video signal, the signal converter comprising:

a laser light source;

a modulation means for modulating the frequency of output light of the laser light source with the multichannel video signal and modulating the intensity of the output light with the microwave signal; and a light receiver for receiving the output light modulated by the modulation means and for outputting the microwave signal, the frequency of which has been modulated with the multichannel video signal, wherein the modulation means comprises:

a circuit for superimposing the multichannel video signal with driving current to be supplied to the laser light source, thereby modulating the frequency of the output light of the laser light source;

a first optical coupler for branching the output light of the laser light source into two luminous fluxes;

a light intensity modulator for modulating the intensity of one of the two luminous fluxes, branched by the first optical coupler, with the microwave signal; and a second optical coupler for coupling the other one of the two luminous fluxes, branched by the first optical coupler, with the output of the light intensity modulator.

2. The signal converter of claim 1, wherein the laser light source is a semiconductor laser.

3. The signal converter of claim 1, wherein the laser light source is a semiconductor laser including an external resonant cavity.

* * * * *